(12) United States Patent
Gharabegian

(10) Patent No.: US 10,488,834 B2
(45) Date of Patent: Nov. 26, 2019

(54) INTELLIGENT UMBRELLA OR ROBOTIC SHADING SYSTEM HAVING TELEPHONIC COMMUNICATION CAPABILITIES

(71) Applicant: SHADECRAFT, INC., Pasadena, CA (US)

(72) Inventor: Armen Sevada Gharabegian, Glendale, CA (US)

( * ) Notice: Subject to any disclaimer, the term of this patent is extended or adjusted under 35 U.S.C. 154(b) by 0 days.

(21) Appl. No.: 15/669,964

(22) Filed: Aug. 7, 2017

(65) Prior Publication Data

US 2018/0332154 A1 Nov. 15, 2018

Related U.S. Application Data

(60) Provisional application No. 62/505,910, filed on May 13, 2017.

(51) Int. Cl.
*H04M 1/18* (2006.01)
*G05B 15/02* (2006.01)
(Continued)

(52) U.S. Cl.
CPC .............. *G05B 15/02* (2013.01); *E04F 10/02* (2013.01); *E04F 10/04* (2013.01); *E04F 10/06* (2013.01);
(Continued)

(58) Field of Classification Search
CPC ........... H04M 1/21; H04M 1/18; E04H 15/02; E04H 15/28; H04W 84/12; E04F 10/00;
(Continued)

(56) References Cited

U.S. PATENT DOCUMENTS

| 138,774 A | 6/1873 | Whitcomb |
|---|---|---|
| 2,485,118 A | 10/1949 | Simpson |

(Continued)

FOREIGN PATENT DOCUMENTS

| CN | 102258250 | 11/2011 |
|---|---|---|
| CN | 202974544 | 6/2013 |

(Continued)

OTHER PUBLICATIONS

International Search Report and Written Opinion of International Searching Authority, International Application No. PCT/US2017/045059, dated Jan. 25, 2018.

(Continued)

*Primary Examiner* — Eugene Yun

(57) ABSTRACT

An intelligent umbrella comprises shading elements, a support assembly, coupled to the one or more shading elements, to provide support for the one or more shading elements, the support assembly comprising one or more microphones to capture audio commands. The intelligent umbrella further includes one or more processors, one or more memory modules and a cellular telecommunications transceiver, and a base assembly, coupled to the support assembly, to provide contact with a surface. Computer-readable instructions stored in the memory modules are executed by a processor to convert the captured audio commands into one or more audio files, generate one or more analog and/or digital phone transmission files based at least in part on the converted one or more audio files, and communicate the one or more analog and/or digital phone transmission files via the cellular transceiver to a base station to initiate transmission of a telephone call.

20 Claims, 11 Drawing Sheets

(51) Int. Cl.

| | | |
|---|---|---|
| *G10L 15/22* | (2006.01) | |
| *E04F 10/02* | (2006.01) | |
| *H04M 1/21* | (2006.01) | |
| G10L 15/28 | (2013.01) | |
| *E04F 10/10* | (2006.01) | |
| *E04F 10/04* | (2006.01) | |
| *E04F 10/06* | (2006.01) | |
| *H02S 20/32* | (2014.01) | |
| E04H 15/02 | (2006.01) | |
| G06N 5/04 | (2006.01) | |
| H02S 20/30 | (2014.01) | |
| H02S 99/00 | (2014.01) | |
| H02S 40/38 | (2014.01) | |
| E04H 15/28 | (2006.01) | |
| E04F 10/00 | (2006.01) | |
| H04W 84/12 | (2009.01) | |
| E04H 15/58 | (2006.01) | |

(52) U.S. Cl.
CPC .............. *E04F 10/10* (2013.01); *G10L 15/22* (2013.01); *G10L 15/28* (2013.01); *H02S 20/32* (2014.12); *H04M 1/18* (2013.01); *H04M 1/21* (2013.01); E04F 10/00 (2013.01); E04H 15/02 (2013.01); E04H 15/28 (2013.01); E04H 15/58 (2013.01); G06N 5/04 (2013.01); G10L 2015/223 (2013.01); H02S 20/30 (2014.12); H02S 40/38 (2014.12); H02S 99/00 (2013.01); H04W 84/12 (2013.01)

(58) Field of Classification Search
CPC . E04F 10/10; E04F 10/04; E04F 10/06; E04F 10/02; G05B 15/02
USPC ........................................................ 455/66.1
See application file for complete search history.

(56) References Cited

U.S. PATENT DOCUMENTS

| | | | |
|---|---|---|---|
| 5,002,082 A | 3/1991 | Roder | |
| 5,161,561 A | 11/1992 | Jamieson | |
| 5,273,062 A | 12/1993 | Mozdzanowski | |
| 5,318,055 A | 6/1994 | Olaniyan | |
| 6,405,742 B1 | 6/2002 | Driscoll | |
| 6,536,721 B1 | 3/2003 | Kao | |
| 6,554,012 B2 | 4/2003 | Patarra | |
| 6,575,183 B2 | 6/2003 | Tung | |
| 6,837,255 B2 | 1/2005 | Bunch | |
| 6,845,780 B2 | 1/2005 | Bishirjian | |
| 6,923,193 B2 | 8/2005 | Chen | |
| 7,003,217 B2 | 2/2006 | Bachinski et al. | |
| 7,407,178 B2 | 8/2008 | Freedman | |
| 7,431,469 B2 | 10/2008 | Li | |
| 7,726,326 B2 | 6/2010 | O'Donnell | |
| 7,891,633 B2 | 2/2011 | Li | |
| 7,926,497 B2 | 4/2011 | Young et al. | |
| 8,345,889 B2 | 1/2013 | Li | |
| 8,387,641 B1 | 3/2013 | Ilan | |
| 8,413,671 B2 | 4/2013 | Ma | |
| 8,672,287 B2 | 3/2014 | Li | |
| 9,125,462 B2 | 9/2015 | Akin | |
| 9,222,693 B2 | 12/2015 | Gourlay et al. | |
| 9,289,039 B2 | 3/2016 | Akin et al. | |
| 9,345,295 B2 | 5/2016 | Li | |
| 9,510,653 B2 | 12/2016 | Akin | |
| 2002/0185582 A1 | 12/2002 | Li | |
| 2003/0000557 A1 | 1/2003 | Lai | |
| 2003/0000559 A1 | 1/2003 | Wu | |
| 2004/0103934 A1 | 6/2004 | Szumlic | |
| 2004/0261827 A1 | 12/2004 | Chen | |
| 2005/0016571 A1 | 1/2005 | Wu | |
| 2005/0279396 A1 | 12/2005 | Choi | |
| 2006/0016465 A1 | 1/2006 | Johannes van Loosbroek et al. | |
| 2006/0016955 A1 | 1/2006 | Kao | |
| 2006/0084450 A1* | 4/2006 | Dam Nielsen .... | H04M 1/27455 455/466 |
| 2007/0040647 A1 | 2/2007 | Saenz et al. | |
| 2007/0127231 A1 | 6/2007 | Li | |
| 2007/0283987 A1 | 12/2007 | Reyes | |
| 2008/0056898 A1 | 3/2008 | Li | |
| 2008/0062128 A1 | 3/2008 | Brodersen et al. | |
| 2008/0076379 A1 | 3/2008 | Li | |
| 2009/0056775 A1 | 3/2009 | Keulbs | |
| 2009/0058354 A1 | 3/2009 | Harrison | |
| 2010/0132751 A1 | 6/2010 | Li | |
| 2010/0245032 A1 | 9/2010 | Li | |
| 2011/0088734 A1 | 4/2011 | Garcia | |
| 2013/0048829 A1 | 2/2013 | Herniak | |
| 2013/0306628 A1 | 11/2013 | Volin | |
| 2014/0041555 A1 | 2/2014 | Ramberg | |
| 2014/0317168 A1 | 10/2014 | Suresh | |
| 2015/0136944 A1 | 5/2015 | Segev | |
| 2015/0216273 A1* | 8/2015 | Akin ..................... | A45B 25/00 135/16 |
| 2015/0216274 A1 | 8/2015 | Akin | |
| 2015/0237975 A1 | 8/2015 | Ng | |
| 2015/0245691 A1 | 9/2015 | Fitgerald | |
| 2015/0374083 A1 | 12/2015 | Akin | |
| 2016/0095398 A1 | 4/2016 | Li | |
| 2016/0119699 A1* | 4/2016 | Caban ................... | H04R 1/025 381/120 |
| 2016/0198818 A1 | 7/2016 | Akin | |
| 2016/0326765 A1 | 11/2016 | Barbret | |
| 2016/0338457 A1 | 11/2016 | Gharabegian | |
| 2017/0055653 A1 | 3/2017 | Gharabegian | |
| 2017/0071300 A1 | 3/2017 | Gharabegian | |
| 2017/0086545 A1 | 3/2017 | Gharabegian | |
| 2017/0086546 A1 | 3/2017 | Gharabegian | |
| 2017/0105497 A1 | 4/2017 | Gharabegian | |
| 2018/0291633 A1* | 10/2018 | Thompson .......... | E04F 10/0666 |

FOREIGN PATENT DOCUMENTS

| | | |
|---|---|---|
| CN | 203073199 | 7/2013 |
| CN | 103405009 | 11/2013 |
| CN | 104469162 | 3/2015 |
| CN | 104835334 | 8/2015 |
| CN | 105193034 | 12/2015 |
| CN | 201580588 | 4/2016 |
| CN | 106163041 | 11/2016 |
| EP | EP 1731055 | 12/2006 |
| FR | 2977457 A1 | 1/2013 |
| GR | 20060100244 | 11/2007 |
| WO | WO 2005092140 | 10/2005 |
| WO | WO 2010/098735 | 9/2010 |
| WO | WO 2011140557 | 11/2011 |

OTHER PUBLICATIONS

Interntional Search Report and Written Opinion of International Searching Authority, International Application No. PCT/US2017/043789, dated Nov. 23, 2017.

International Search Report and Written Opinion of International Searching Authority Application No. PCT/US2017/052595, dated Feb. 21, 2018.

GPS Sun Tracking Solar Panel; Alyammahi et al., published May 7, 2015, accessed Jun. 21, 2017 from https:repository.lib.fit.edu/handle/11141/628?show=full.

International Search Report, PCT Application No. PCT/US2017/068771, dated May 10, 2018, Federal Institute of Industrial Property, Authorized Officer, A. Chekalkina.

* cited by examiner

_US 10,488,834 B2_

INTELLIGENT UMBRELLA OR ROBOTIC SHADING SYSTEM HAVING TELEPHONIC COMMUNICATION CAPABILITIES

RELATED APPLICATIONS

This application claims priority to provisional application Ser. No. 62/505,910, filed May 13, 2017 and entitled "Artificial Intelligence (AI) Computing Device with Shading System," the disclosure of which is hereby incorporated by reference.

BACKGROUND

1. Field

The subject matter disclosed herein relates to an intelligent umbrella/robotic shading system having telephonic communication capabilities.

2. Information/Background of the Invention

Conventional sun shading devices and systems usually are comprised of a supporting frame and an awning or fabric mounted on the supporting frame to cover a pre-defined area. For example, a conventional sun shading device or system may be an outdoor umbrella or an outdoor awning. Mobile communication devices allow users to communicate with other users in a variety of environments without being tethered to a land line. However, current mobile communication devices do not operate well in certain outdoor environments (hot and/or humid environments and/or areas with a large amount of sunlight with little shade). In addition, mobile communication devices may be damaged by being dropped in certain outdoor environments (e.g., concrete, sand, pools, etc.) and/or are easily misplaced if user is engaging in outdoor activities.

DETAILED DESCRIPTION

Figure 1:
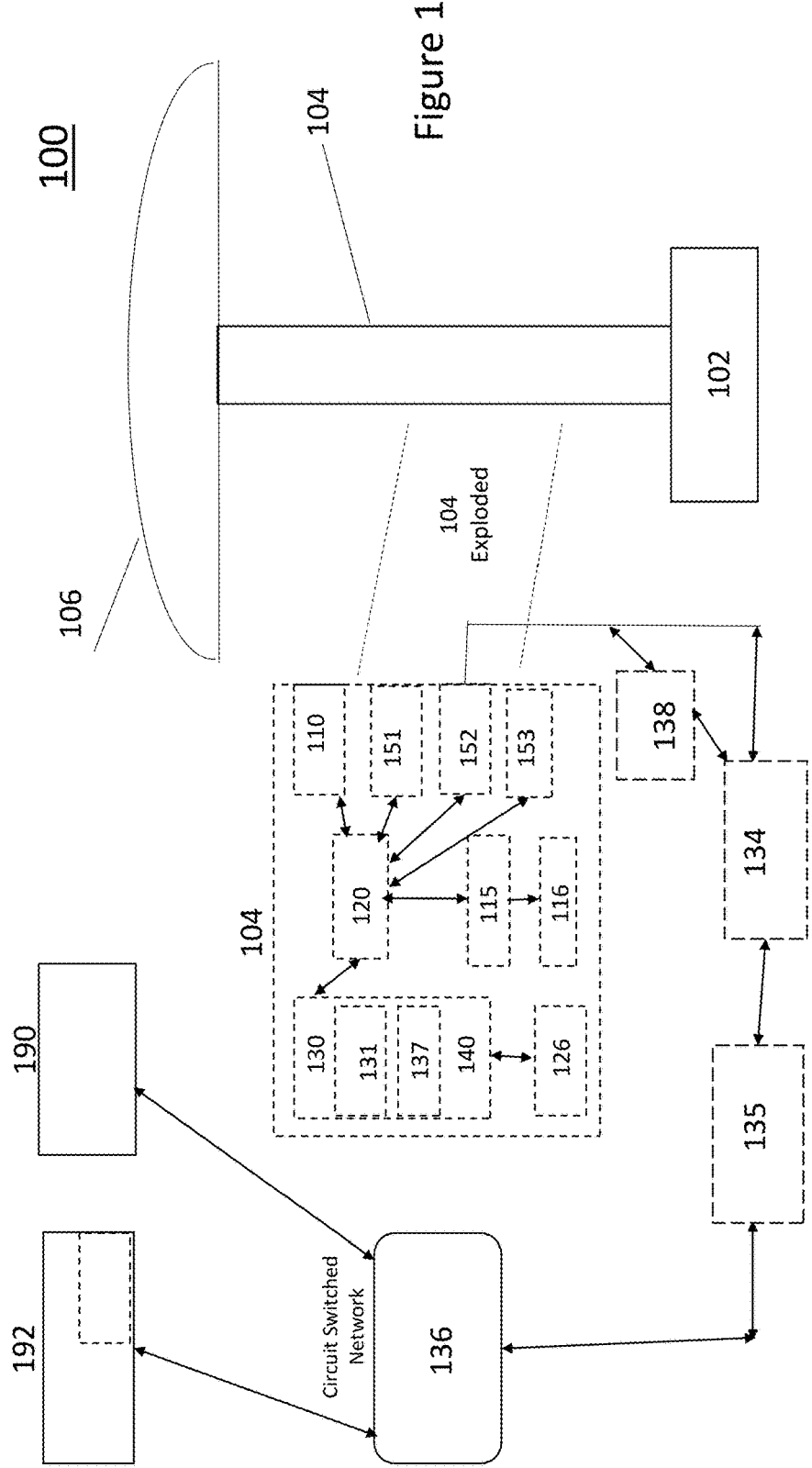
FIG. 1 illustrates an intelligent umbrella and/or a robotic shading system comprising automatic telephone or voice communication functionality according to embodiments.

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

References throughout this specification to one implementation, an implementation, one embodiment, embodiments, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more computing devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

A network may comprise two or more network and/or computing devices and/or may couple network and/or computing devices so that signal communications, such as in the form of signal packets, for example, may be exchanged, such as between a server and a client device and/or other types of devices, including between wireless devices coupled via a wireless network, for example.

In this context, the term computing device refers to any device capable of communicating via and/or as part of a network. While computing devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments.

Computing devices, mobile computing devices, and/or network devices capable of operating as a server, or otherwise, may include, as examples, rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases, database servers, application data servers, proxy servers, and/or portions thereof, as appropriate.

It should be understood that for ease of description a network device may be embodied and/or described in terms of a computing device and/or mobile computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

Operations and/or processing, such as in association with networks, such as computing and/or communications networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context. In a context of this application, if signals, instructions, and/or commands are transmitted from one component (e.g., a controller or processor) to another component (or assembly), it is understood that messages, signals, instructions, and/or commands may be transmitted directly to a component, or may pass through a number of other components on a way to a destination component. For example, a signal transmitted from a motor controller or processor to a motor (or other driving assembly) may pass through glue logic, an amplifier, an analog-to-digital converter, a digital-to-analog converter, another controller and/or or processor, and/or an interface. Similarly, a signal communicated through a misting system may pass through an air conditioning and/or a heating module, and a signal communicated from any one or a number of sensors to a controller and/or processor may pass through a conditioning module, an analog-to-digital controller, and/or a comparison module, and/or a number of other electrical assemblies and/or components.

Likewise, the term "based on," "based, at least in part on," and/or similar terms (e.g., based at least in part on) are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include for example, past, present and/or future mass storage, such as network attached storage (NAS), cloud storage, a storage area network (SAN), cloud storage, cloud server farms, and/or other forms of computing and/or device readable media, for example. A network may include a portion of the Internet, one or more local area networks (LANs), one or more wide area networks (WANs), wire-line type connections, one or more personal area networks (PANs), wireless type connections, one or more mesh networks, one or more cellular communication networks, other connections, or any combination thereof. Thus, a network may be worldwide in scope and/or extent.

The Internet and/or a global communications network may refer to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet may include local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices and/or computing devices may engage in an HTTP session through an exchange of appropriately compatible and/or compliant signal packets and/or frames. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. A content delivery server and/or the Internet and/or the Web, therefore, in this context, may comprise an service that organizes stored content, such as, for example, text, images, video, etc., through the use of hypermedia, for example. A HyperText Markup Language ("HTML"), Cascading Style Sheets ("CSS") or Extensible Markup Language ("XML"), for example, may be utilized to specify content and/or to specify a format for hypermedia type content, such as in the form of a file and/or an "electronic document," such as a Web page, for example. HTML and/or XML are merely example languages provided as illustrations and intended to refer to any version, now known and/or developed at another time and claimed subject matter is not intended to be limited to examples provided as illustrations, of course.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as 1) time of day at which an image was captured, latitude and longitude of an image capture device, such as a camera; 2) time and day of when a sensor reading (e.g., humidity, temperature, air quality, UV radiation) was received; and/or 3) operating conditions of one or more motors or other components or assemblies in a modular umbrella shading system. Claimed subject matter is intended to embrace meaningful, descriptive parameters in any format, so long as the one or more parameters comprise physical signals and/or states, which may include, as parameter examples, name of the collection of signals and/or states.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In embodiments, a modular umbrella shading system may comprise a computing device installed within or as part of a modular umbrella system, intelligent umbrella and/or intelligent shading charging system. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, numbers, numerals or the like, and that these are conventional labels. Unless specifically stated otherwise, it is appreciated that throughout this specification discussions utilizing terms such as "processing," "computing," "calculating," "determining" or the like may refer to actions or processes of a specific apparatus, such as a special purpose computer or a similar special purpose electronic computing device (e.g., such as a shading object computing device). In the context of this specification, therefore, a special purpose computer or a similar special purpose electronic computing device (e.g., a modular umbrella computing device) is capable of manipulating or transforming signals (electronic and/or magnetic) in memories (or components thereof), other storage devices, transmission devices sound reproduction devices, and/or display devices.

In an embodiment, a controller and/or a processor typically performs a series of instructions resulting in data manipulation. In an embodiment, a microcontroller or microprocessor may be a compact microcomputer designed to govern the operation of embedded systems in electronic devices, e.g., an intelligent, automated shading object or umbrella, intelligent umbrella, robotic shading systems, and/or shading charging systems, and various other electronic and mechanical devices coupled thereto or installed thereon. Microcontrollers may include processors, microprocessors, and other electronic components. Controller may be a commercially available processor such as an Intel Pentium, Motorola PowerPC, SGI MIPS, Sun UltraSPARC, or Hewlett-Packard PA-RISC processor, but may be any type of application-specific and/or specifically designed processor or controller. In an embodiment, a processor and/or controller may be connected to other system elements, including one or more memory devices, by a bus, a mesh network or other mesh components. Usually, a processor or controller, may execute an operating system which may be, for example, a Windows-based operating system (Microsoft), a MAC OS System X operating system (Apple Computer), one of many Linux-based operating system distributions (e.g., an open source operating system) a Solaris operating system (Sun), a portable electronic device operating system (e.g., mobile phone operating systems), microcomputer operating systems, and/or a UNIX operating systems. Embodiments are not limited to any particular implementation and/or operating system.

The specification may refer to an intelligent umbrella/robotic shading system (or an intelligent shading object or an intelligent umbrella) as an apparatus that provides shade and/or coverage to a user from weather elements such as sun, wind, rain, and/or hail. In embodiments, the intelligent umbrella may be an automated intelligent shading object, automated intelligent umbrella, standalone intelligent umbrella, and/or automated intelligent shading charging system. The robotic shading system may also be referred to as a parasol, intelligent umbrella, sun shade, outdoor shade furniture, sun screen, sun shelter, awning, sun cover, sun marquee, brolly and other similar names, which may all be utilized interchangeably in this application. Shading objects and/or robotic shading systems which also have electric vehicle charging capabilities may also be referred to as intelligent umbrella charging systems. These terms may be utilized interchangeably throughout the specification. The robotic shading systems, shading objects, intelligent umbrellas, umbrella charging systems and shading charging systems described herein comprises many novel and non-obvious features, which are described in detail in the following patent applications, In embodiments, a user and/or individual may speak a command instructing a shading system, intelligent umbrella or parasol and/or a robotic shading system to place a phone call and/or engage in a conversation utilizing the umbrella, parasol and/or robotic shading system as a telephone communication device (e.g., telephone). In other words, in an outdoor environment, rather than using a cellular telephone and/or a wireless communication device, a user, operator and/or guest may be able to place hands-free telephone calls utilizing a shading system, intelligent umbrella and/or a robotic shade system. In embodiments, this functionality of telephone call placement allows a user, operator and/or guest to be able to not carry and/or bring a mobile communications device in an outdoor environment (where it may be damaged and/or lost). This is beneficial and advantageous because mobile communications devices and/or mobile telephones may overheat in outdoor environments when exposed to sunlight and/or heat. In embodiments, mobile communication devices and/or cellular telephone devices may also suffer damage by 1) dropping into bodies of water (e.g., pools, lakes, oceans); 2) having sand or other material get into the electronics of the mobile communication devices and/or mobile telephones; and 3) falling onto hard surfaces such as concrete which may cause the mobile communications devices and/or mobile telephones (and/or screens of such) to crack and/or shatter. In addition, mobile communications device screens may be difficult to view in direct sunlight. Further, mobile communication devices are easily misplaced in outdoor environments and thus having a hands-free option via the shading system, intelligent umbrella and/or robotic shading system may provide a benefit to users, operators and/or guests in outdoor environments.

FIG. 1 illustrates an intelligent umbrella and/or a robotic shading system comprising automatic telephone or voice communication functionality according to embodiments. In embodiments, an intelligent umbrella/robotic shading system 100 may comprise an array of microphones (e.g., voice capture devices 110), one or more processors 120, one or more memory modules 130, computer-readable instructions stored in the one or more memory modules 140, one or more transceivers 150 (e.g., a cellular transceiver 151, a WiFi transceiver 152 and/or a personal area network transceiver 153), a base assembly 102, a support assembly 104 and/or an expansion shading assembly 106. In embodiments, telephone calls may be placed from one intelligent umbrella/robotic shading system 100 to another intelligent umbrella/robotic shading system 190 or may be placed to a mobile computing and/or communications device 192. In embodiments, telephone calls may be placed utilizing a WiFi transceiver 152 (e.g., utilizing a VoIP application and/or API and third party server application) and utilizing a global communications network (e.g., an Internet) as a communication medium). In embodiments, telephone calls may be placed utilizing a cellular transceiver 151 of an intelligent shading/robotic shading system 100.

In embodiments, an intelligent umbrella/robotic shading system 100 may comprise telephony application computer-readable instructions 140 stored in one or more memory modules 130 and executed by one or more processors 120. In embodiments, a telephony application (e.g., telephony computer-readable instructions executed by one or more processors 120) may receive an audio file captured and generated by one or more microphones 110 in response an operator, guest and/or user voice command, may determine a phone number corresponding to and/or associated with the generated audio file by comparing a portion of an audio file to a database 132 stored in one or memory modules 130, and may generate an analog and/or digital phone transmission file based on the determined name and/or identified phone number. In embodiments, a database 132 of telephone numbers and associated names may be resident in one or more memory modules 130 (or may be located in a separate memory including a database).

In embodiments, an analog and/or digital phone transmission file may be communicated via a cellular transceiver 151 to a cellular circuit switched network (e.g., a base station and/or a base station controller 134). In embodiments, a communicated phone transmission file may be communicated from a base station and/or base station controller 134) to a mobile switching center 135 and into a circuit switched network 136 (e.g., a core portion of a circuit switched network). In embodiments, a communicated phone transmission file may be transmitted and/or communicated to a desired mobile communication device 192 and/or another intelligent umbrella/robotic shading system 190 which may complete a telephone call (e.g., a circuit switched telephone call).

In embodiments, an intelligent umbrella and/or robotic shading system 100 may comprise computer readable instructions 130 stored in one or more memory modules 130 and executed by one or more processors 120. In embodiments, computer readable instructions 130 may comprise a telephony application programming interface 137 ("telephony API"). In embodiments, a telephony application programming interface 137 may communicate and/or interact with a telephony application on an external server 138. Although FIG. 1 illustrates a telephony API 137 stored as computer-readable instructions in a memory 130 of an intelligent umbrella, portions of a telephony API 137 may also be located in an external server 138 and/or a base station 134 and/or a router 135. In embodiments, an external server 138 having a telephony application may be co-located and/or part of a base station and/or base station controller 134 and/or a mobile switching center 135. In an external server 138, a telephony application may be stored in one or more memory modules and/or executed by one or more processors. In embodiments, one or more microphones 110 integrated within an intelligent umbrella/robotic shading system 100 may capture an audio command (e.g., call Ryan) and generate an analog and/or digital audio file. In embodiments, a telephony API 137 may be initiated (e.g., in response to capturing an audio command and/or certain recognized audio command). In embodiments, a telephony API 137 (e.g., computer-readable instructions) may be executed by one or more processors 120 and may communicate an analog and/or digital audio file via a cellular transceiver 151 to a base station 134 and/or a mobile switching center 135. In embodiments, a telephony application 139 in an external server 138 may receive this analog and/or digital audio file (from either base station 134 and/or mobile switching center 135). In embodiments, because a telephony application 139 is co-located and/or resident on a base station 134 and/or mobile switching center 135 (because the external server 138 is located there) may analyze the received analog and/or digital audio file), and may compare contents of the received analog and/or digital audio file to numbers and associated names stored in a database of an external server. In embodiments, based on a comparison, a telephony application 139 may determine a telephone number (e.g., of Ryan) corresponding to a recognized name and may generate an analog and/or digital telephone transmission file to be communicated and/or transmitted to a desired mobile computing or computing device 192 and/or intelligent umbrella/robotic shading system 190 through a circuit-switched network to complete a telephone call. In embodiments, the analog and/or digital telephone transmission file may pass through base station 134, a mobile switching center 135 and/or a core network portion of a circuit switched network 136 on the way to either mobile computing or computing device 192 and/or intelligent umbrella/robotic shading system 190. In the two embodiments described above, a robotic shading system and/or intelligent umbrella may utilize an existing public-switched telephone network to complete a telephone call. After the call has been placed and connected to an intelligent umbrella/robotic shading system 190, the intelligent umbrella/robotic shading system 190 may take and/or complete the actions described above in responding to the telephone call and these communication will remain open until the placed telephone call is completed (e.g., one end hangs up). If the call was placed to a mobile communications device 192, then the mobile communications device will respond to the call by transmitting an analog audio file to a base station and/or mobile switching center that is located closer to the mobile communications device 192 and then to the core network 135 for its return trip to an initiating intelligent umbrella/robotic shading system 100.

Figure 2:
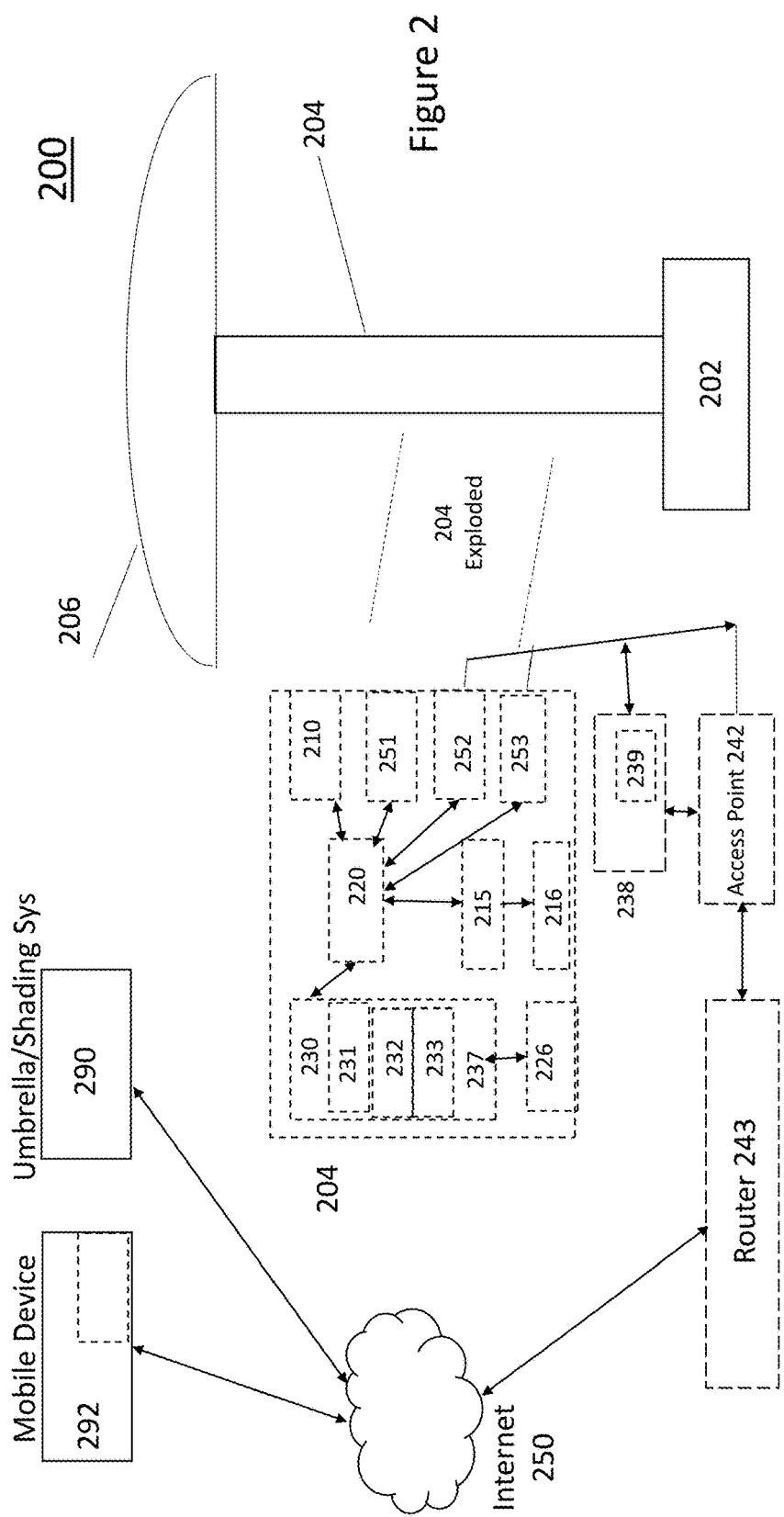
FIG. 2 illustrates an intelligent umbrella and/or robotic shading systems with voice or telephone call placement capability according to embodiments.

FIG. 2 illustrates an intelligent umbrella and/or robotic shading systems with voice or telephone call placement capability according to embodiments. In embodiments, an intelligent umbrella/robotic shading system 200 may comprise an array of microphones 210 (e.g., voice capture devices 210), one or more processors 220, one or more memory modules 230, computer-readable instructions 231 stored in the one or more memory modules 230, one or more transceivers (e.g., a cellular transceiver 251, a WiFi transceiver 252 and/or a personal area network transceiver 253), a base assembly 202, a support assembly 204 and/or an expansion shading assembly 206. In embodiments, telephone calls may be placed from one intelligent umbrella/robotic shading system 200 to another intelligent umbrella/robotic shading system 290 or may be placed to a mobile computing and/or communications device 292. In embodiments, telephone calls may be placed utilizing a WiFi transceiver 252 and/or PAN transceiver 253 (e.g., utilizing a VoIP application and/or VoIP API and third party VoIP server application) and utilizing a global communications network 250 (e.g., an Internet) as a communication medium.

In embodiments, an intelligent umbrella/robotic shading system 200 may comprise Voice Over Internet Protocol (VoIP) computer-readable instructions 232 stored in one or more memory modules 230 and executed by one or more processors 220. In embodiments, a VoIP application 232 (e.g., VoIP computer-readable instructions executed by one or more processors 220) may receive an audio file captured and generated by one or more microphones 210 in response an operator, guest and/or user voice command. In embodiments, a VoIP application 232 may determine a phone number corresponding to and/or associated with the generated audio file (and name spoken or mentioned) by comparing a portion of an analog audio file to a database 233 (having phone numbers and corresponding names) stored in one or memory modules 230, and may generate digital phone transmission packets based on the determined and/or identified phone number and the received analog audio file. In other words, a VoIP application 232 may convert an analog voice file into digital packets. In embodiments, a database 233 of telephone numbers with corresponding names may be resident in one or more memory modules 230 (or the database 233 may be located in a separate memory apart from memory module 230.

In embodiments, digital phone transmission packets may be communicated to a packet-switched network utilizing a WiFi transceiver 252 and/or a PAN transceiver 253. In embodiments, a communicated digital phone transmission packets may be communicated to an access point 242 and/or a router 243. In embodiments, a router 243 may communicate digital phone transmission packets to a global communications network 250 (e.g., the Internet). In embodiments, the digital phone transmission packets may be communicated from the global communications network 250 to a desired mobile communication and/or computing device 292 and/or intelligent umbrella/robotic shading system 290 which may complete a telephone call (e.g., a packet switched telephone call) to a desired mobile device 292 and/or intelligent umbrella/robotic shading system 290. In embodiments, digital phone transmission packets may be communicated through a remote router (not shown) and/or access point (not shown) to a mobile communication device 292 and/or umbrella/robotic shading system 290 through PAN and/or WiFi transceivers (not shown). In embodiments, digital phone transmission packets may be converted to analog telephone signals and the telephone signals may be communicated through the PSTN to mobile switching centers through base stations and then to mobile communication devices 292 and/or intelligent umbrella/robotic shading systems 290 via cellular transceivers (not shown). In this embodiment, a last leg of the telephone call is through a circuit-switched public telephone network. The selected mobile communication device 292 and/or intelligent umbrella/robotic shading system 290 may then communicate back with the initiating intelligent umbrella/robotic shading system 200 utilizing the same communication path just described.

In embodiments, digital phone transmission packets may be communicated to a packet-switched network through an access point 242 and/or a router 243. In embodiments, a router 243 may communicate digital phone transmission packets to a global communications network 250 (e.g., the Internet). In embodiments, the digital phone transmission packets may be communicated from the global communications network 250 to a desired mobile communication and/or computing device 292 and/or intelligent umbrella/robotic shading system 290 which may complete a telephone call (e.g., a packet switched telephone call). In embodiments, digital phone transmission packets may be communicated through a remote router (not shown) and/or access point (not shown) to a mobile communication device 292 and/or umbrella/robotic shading system 290 through PAN and/or WiFi transceivers (not shown). In embodiments, digital phone transmission packets may be converted to analog telephone signals and the telephone signals may be communicated through a portion of a PSTN to mobile switching centers, to base stations and then to mobile communication devices 292 and/or intelligent umbrella/robotic shading systems 290 via cellular transceivers (not shown). In these embodiments, the last leg of the telephone call may be through the public telephone switched network (e.g., the circuit switched telephone network). In these described embodiments, the selected mobile communication device 292 and/or intelligent umbrella/robotic shading system 290 may then communicate back with the initiating intelligent umbrella/robotic shading system 200 utilizing the same communication paths described in detail above.

The functionality and features discussed above with the intelligent umbrella and/or robotic shading system with respect FIGS. 1 and 2 may also be included in other intelligent umbrella and/or robotic shading systems such as the intelligent umbrellas/robotic shading systems described in FIGS. 1, 2, 20A and 21 of patent application Ser. No. 15/436,749, filed Feb. 17, 2017 and entitled "Marine Vessel with Intelligent Shading System". The operation of the intelligent umbrellas/robotic shading systems (FIGS. 1, 2, 20A and 21 of patent application Ser. No. 15/436,749) is described in detail in application Ser. No. 15/436,749, filed Feb. 17, 2017 and entitled "Marine Vessel with Intelligent Shading System, the disclosure of which is incorporated by reference. In addition, the functionality and features discussed above with respect to the intelligent umbrella and/or robotic shading system described in FIGS. 1 and 2 of the present application may be implemented and/or incorporated into the marine vessel intelligent umbrellas illustrated in FIGS. 27, 28 and 29 and described in detail in the specification of application Ser. No. 15/436,749, filed Feb. 17, 2017 and entitled "Marine Vessel with Intelligent Shading System," the disclosure of which is hereby incorporated by reference.

In embodiments, an intelligent umbrella and/or robotic shading system 200 may comprise computer readable instructions 231 stored in one or more memory modules 230 and executed by one or more processors 220. In embodiments, computer readable instructions 231 may comprise a VoIP application programming interface 237 ("VoIP API"). In embodiments, a VoIP application programming interface 237 may communicate and/or interact with a VoIP application on an external server 238. In embodiments, an external server 238 having a VoIP application may be co-located and/or part of an access point 242 and/or a router 243. In an external server 238, a VoIP application maybe stored in one or more memory modules and/or executed by one or more processors. In embodiments, one or more microphones 210 integrated within an intelligent umbrella/robotic shading system 200 may capture an audio command (e.g., call Will) and generate an analog and/or digital audio file. In embodiments, a VoIP API 237 may be initiated (e.g., in response to capturing an audio command and/or certain recognized audio command). In embodiments, a VoIP API (e.g., computer-readable instructions) may be executed by one or more processors 220 and may communicate an analog and/or digital audio file via a WiFi transceiver 152 and/or a PAN transceiver 153 to an access point 242 and/or a router 243. Although a VoIP API 237 is shown as being located in memory modules 230 in FIG. 2, portions and/or all of a VoIP API 234 may be located in an external server 238, an access point 242 and/or a router 243. In embodiments, a VoIP application 239 in an external server 238 may receive this analog and/or digital audio file from either access point 242 and/or router 243. In embodiments, because a VoIP application 239 is co-located and/or resident on access point 242 and/or router 243, the VoIP application 239 may analyze the received analog and/or digital audio file. In embodiments, a VoIP application 239 may compare contents of the received analog and/or digital audio file to numbers and associated names stored in database of an external server 238. In embodiments, based on a comparison, a VoIP application 239 may determine a telephone number (e.g., for Will) corresponding to a recognized name and may generate an analog and/or digital audio transmission file to be communicated and/or transmitted to a desired mobile computing or computing device 292 and/or intelligent umbrella/robotic shading system 290 corresponding to the associated name to complete a telephone call. In the two embodiments described above, a robotic shading system and/or intelligent umbrella 200 may utilize an access point 242, a router 243, and/or a global communications network 250 (e.g., the Internet) to complete a telephone call by communicating digital packets. In these described embodiments, the selected mobile communication device 292 and/or intelligent umbrella/robotic shading system 290 may then communicate back with the initiating intelligent umbrella/robotic shading system 200 utilizing the same communication paths described in detail above.

Figure 6:
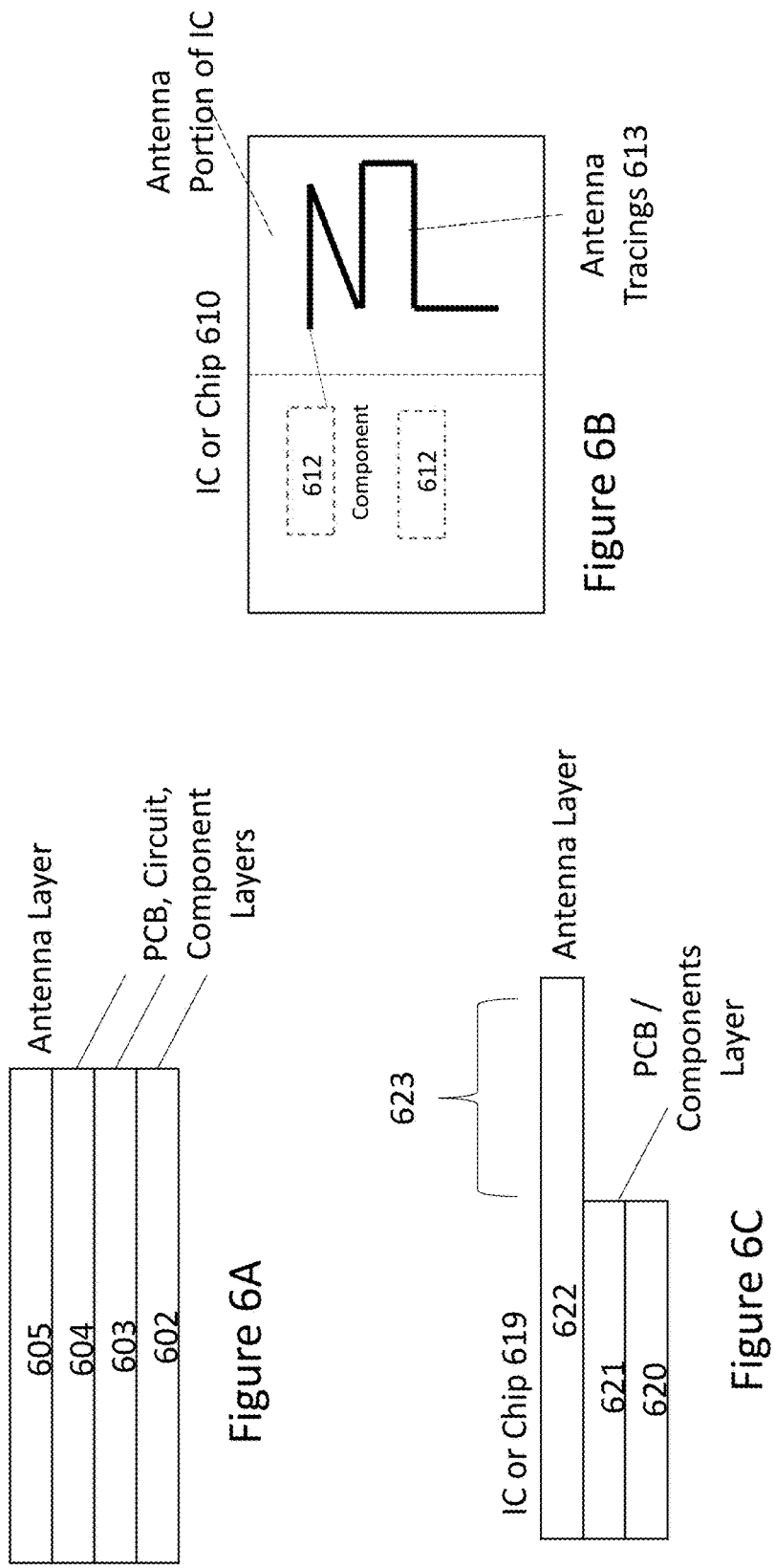
FIGS. 6A, 6B and 6C illustrates integrated circuits having an antenna and/or antenna layer according to embodiments.

In embodiments, an intelligent umbrella and/or robotic shading system may comprise one or more wireless communication antennas that are coupled and/or connected to one or more wireless transceivers. The wireless transceivers may be cellular transceivers 151 may operate according to one or more wireless communications standards (2G, 3G, 4G, 5G), that are part of digital mobile telephone systems GSM, EDGE and/or LTE, and which utilize channel access methods of TDMA, CDMA, and OFDM. In embodiments, WiFi or wireless local area network transceivers 152 may operate according to wireless communication protocol standards 802.11 a-n or 802.11-2007-802.11-2016). In embodiments, PAN transceivers 153 may operate according to wireless personal area network communication protocols such as Bluetooth, Zigbee, IrDA, Z-Wave, Wireless USB and IEEE 802.14, UltraWideBand (UWB). For example, in embodiments, each wireless transceiver (e.g., a cellular transceiver 151, a WiFi transceiver 152 and/or a PAN transceiver 153) may have a corresponding antenna. In embodiments, one antenna may be utilized for two or more transceivers. In embodiments, a wireless transceiver integrated circuit may incorporate and/or integrate one or more antennas. In embodiments, a separate integrated circuit may incorporate, include, comprise and/or integrate one or more antennas into a design. FIGS. 6A, 6B and 6C illustrates integrated circuits having an antenna and/or antenna layer according to embodiments.

In embodiments, such as illustrated by FIG. 6A, an integrated circuit, flex circuit and/or circuit assembly may have more than one layer (e.g., FIG. 6A has four layers 602, 603, 604 and 605). In embodiments, layers such as 602, 603 and 604 may comprise components and/or circuits that are part of wireless communication transceivers (e.g., cellular 151, WiFi 152 and/or PAN 153) and/or other circuits and/or components and one layer may be an antenna layer 605. In embodiments, an antenna layer 605 may have antenna traces made of conductive metals such as copper, aluminum and/or lightweight metal. In embodiments, an antenna layer 605 may include only antenna traces to minimize interference and/or noise from other traces and/or components on different layers (e.g., layers 602 603 604). In embodiments, an antenna layer may only have a portion for its layer including antenna traces. For example, in embodiments, FIG. 6B illustrates a layer of a printed circuit board and/or integrated circuit 610 may comprise components 612 and/or antenna traces 613. As is illustrated in FIG. 6B, antenna traces 613 may be on one portion of a board and/or IC (e.g., a right portion of a PCB layer and/or IC) and components 612 may be placed on a second portion of a board and/or IC (e.g., a left portion of a PCB layer and/or IC). In embodiments, placing antenna traces 613 on one portion of a PCB and/or IC and placing components 612 on a second portion of a PCB and/or IC minimizes interference and/or noise in transmission of data via the antenna 613. FIG. 6C illustrates a PCB and/or IC 619 with more than one layer where an antenna layer or a layer including antennas 622 may be placed so it has free space around it or underneath it, or is of a different length than other layers 621 and 620. In embodiments, antenna tracings may be placed on an entire layer of an antenna layer 622 or on a portion 623 of antenna layer 622 (e.g., portion 623 of antenna layer). By having some, most and/or all of antenna tracings on antenna layer portion 623, wireless transmissions may be generated with lower and/or minimal noise and/or interference from components and/or tracings on PCB layers 621 and 620 and this may provide a higher quality wireless transmission.

Figure 8:
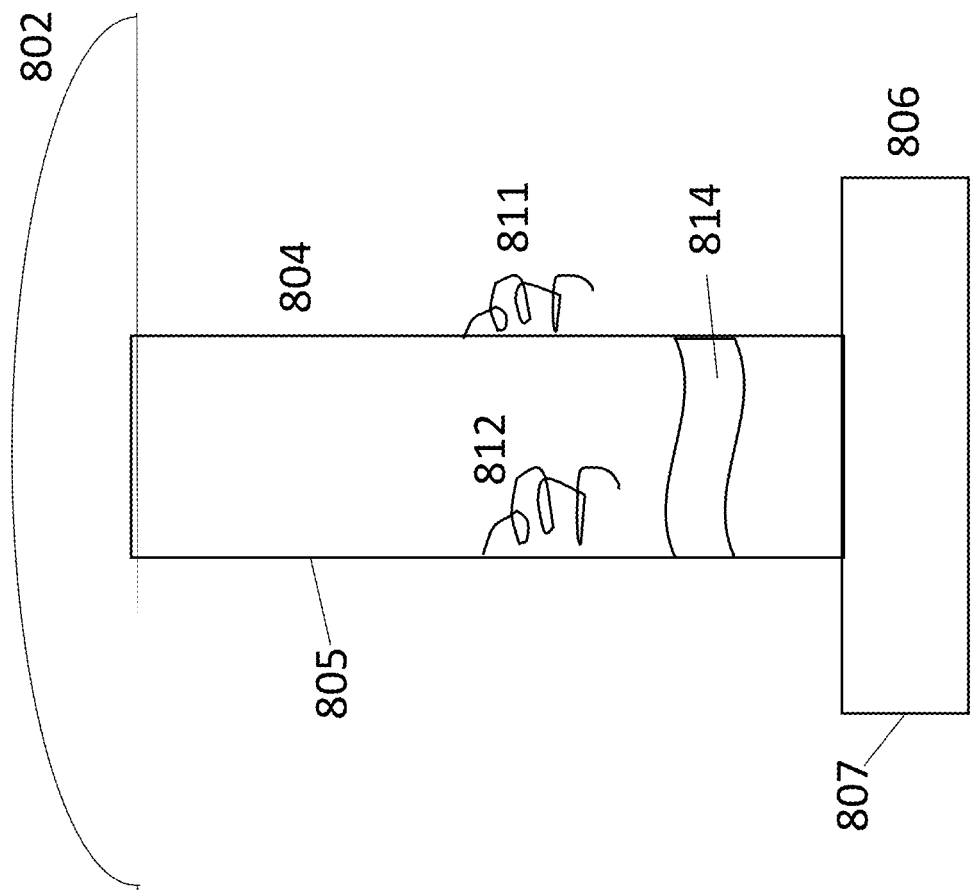
FIG. 8 illustrates a skin of an intelligent umbrella/robotic shading system and antennas coupled thereto according to embodiments.

In embodiments, one or more wireless transceiver antennas may comprise a coiled wire. In embodiments, a coiled conductive wire may be attached and/or coupled to a transceiver (e.g., a cellular transceiver 151, a WiFi transceiver 152 and/or a PAN transceiver 153) (e.g., an integrated circuit and/or PCB comprising any of the above-mentioned transceiver). In embodiments, a coiled wire 711 may be located, coupled and/or connected an internal core of an intelligent umbrella/robotic shading system. For example, a coiled wire may be coupled, connected and/or adhered to an inner core support assembly 712 and/or an inner core of a base assembly 714. In embodiments, an inner core of a support assembly 712 and/or inner core of a base assembly 714 may be made or may be comprised of a lightweight metal (e.g., a lightweight aluminum or other composite). These may be inner cores of intelligent umbrellas/shading systems 100 (FIG. 1) or 200 (FIG. 200). FIG. 8 illustrates a skin of an intelligent umbrella/robotic shading system and antennas coupled thereto. In embodiments, a coiled wire transceiver antenna 811 or 812 may be connected to an inside surface and/or an outside surface of a fiberglass, plastic, and/or composite base assembly 802, support assembly 804 and/or expansion/shading assembly 806. A location of a coiled wire antenna 811 or 812 may be determined based on minimizing footprint within the intelligent umbrella/shading system, placing a coiled wire antenna 811 or 812 away from other transmitting components and/or devices, and/or placing a coil wired antenna 811 or 812 away from moving components within an intelligent umbrella/shading system to not come into contact with moving components and not having to deal with noise created by moving components.

Figure 7:
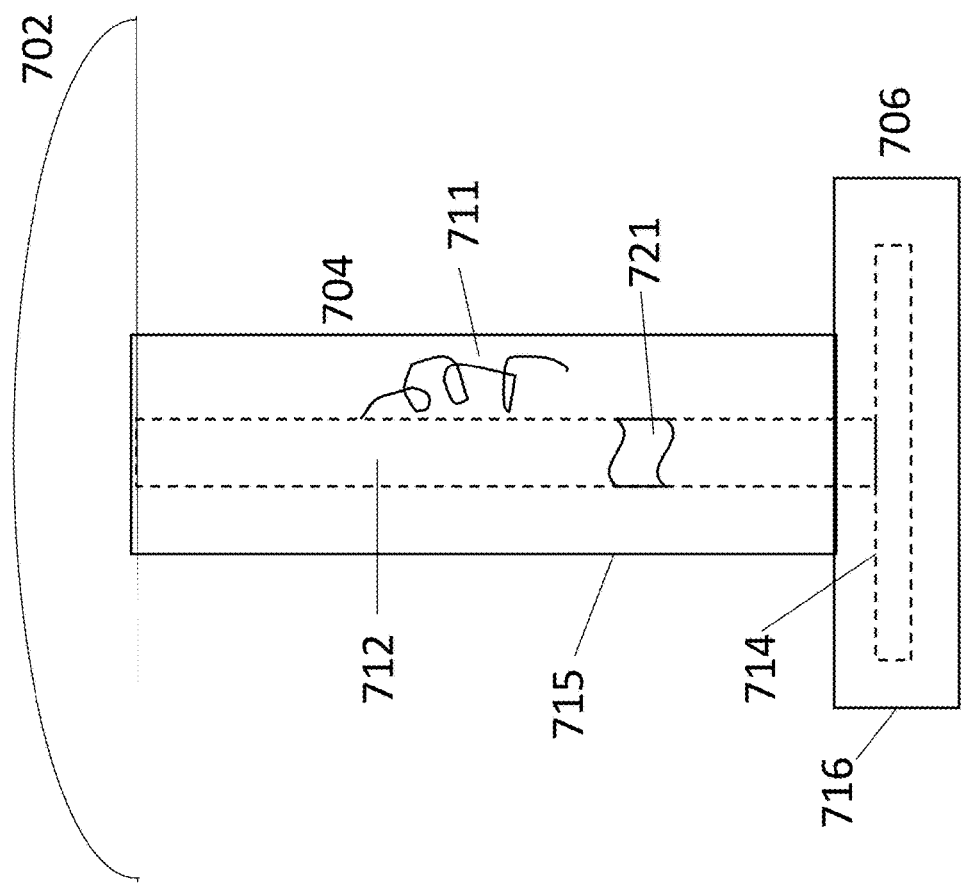
FIG. 7 illustrates an example location for placement of antennas (coiled antennas and metallic rings according to embodiments.

In embodiments, one or more wireless communication transceiver antennas may comprise a metallic ring 712 (e.g., an aluminum and/or copper ring) that is attached, adhered and/or connected to a core assembly 712 of an intelligent umbrella/robotic shading system 700 or a core assembly of a base assembly 714. In embodiments, FIG. 7 illustrates an example location for placement of a metallic ring 712 on a core assembly 714. In embodiments, one or more wireless communication transceiver antennas may comprise a metallic ring 814 (e.g., an aluminum and/or copper ring) may be attached, adhered and/or connected to an outside surface 805 of a support assembly 804 and/or an outside surface 807 of a base assembly 806).

In embodiments, wireless transceiver antennas may be made of aluminum, copper, and/or nickel/copper plating and/or any combination thereof. In embodiments, one or more transceiver antennas may be machined. In embodiments, one or more wireless transceiver antennas may be diecast. In embodiments, one or more transceiver antennas may be etched from a printed circuit board and/or plated. In embodiments, a conductive antenna material may be connected and/or coupled to a dielectric material. In embodiments, a dielectric material may comprise a printed circuit board material (e.g., FR-4 glass epoxy). In embodiments, a printed circuit board material may be a glass fiber reinforced (fiberglass) epoxy resin with a copper foil bonded on to one or both sides. In embodiments, a dielectric material may be parts of the intelligent umbrella/robotic shading system. In embodiments, parts of an intelligent umbrella/robotic shading system may be a skin of the umbrella/system may be a dielectric material such as glass filled Acrylonitrile Butadiene Styrene (ABS) and/or polycarbonate blend, and/or a polypropylene material.

Figure 3A:
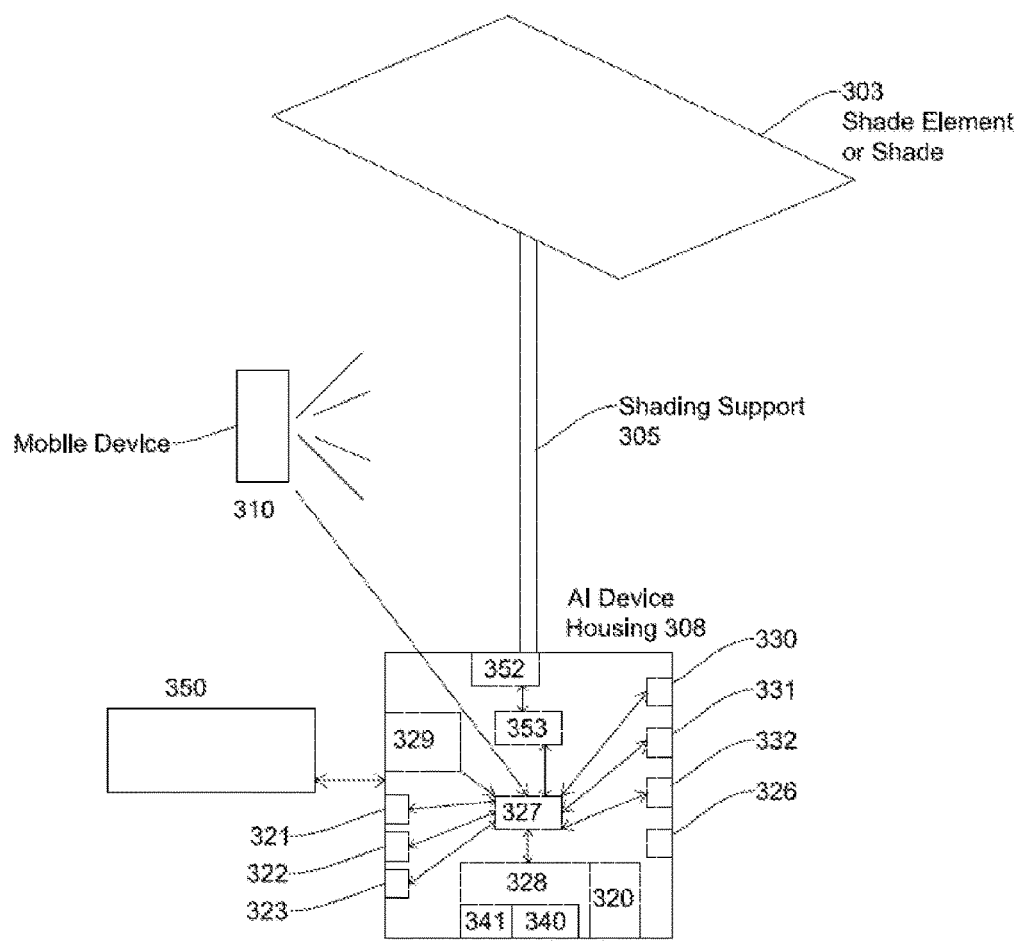
FIG. 3A illustrates an artificial intelligence device or computing device with a shading system or shading element according to embodiments.

In embodiments, artificial intelligence (AI) computing devices with shading elements, fabrics and/or shades may also include telephone placement and receiving capabilities. FIGS. 3A, 3B, 4A, 4B, 5A and 5B illustrate AI computing devices with shading elements, shading fabrics and/or shading systems. FIG. 3A illustrates an artificial intelligence device or computing device with a shading system or shading element according to embodiments. An artificial intelligence (AI) computing device having a shading system or shading elements may comprise a shading frame and/or fabric 303, a shading support assembly 305, and an AI device housing 308.

In embodiments, a shading element or shade 303 may provide shade to keep an AI shading device housing 308 from overheating and/or protect it from other environmental conditions (e.g., rain, sleet, snow, etc.). In embodiments, an AI shading device housing 308 may be coupled and/or connected to a shading support 305. In embodiments, a shading support 305 may be coupled to an AI shading device housing 308. In embodiments, a shading support 305 may support a shade or shading element 303 and move it into position with respect to an AI shading device housing 308. In this illustrative embodiment of FIG. 3, an AI shading device housing 308 may be utilized as a base, mount and/or support for a shading element or shade 303. In embodiments, a shading support 305 may be simple and may not have a tilting assembly and/or may not be adjustable. In embodiments, a shading support 305 may be simplified and not have many electronics, components and/or assemblies installed and/or positioned therein. In embodiments, a shading support 305 may also not include an expansion and sensor assembly. Illustratively, in embodiments, a shading support 305 may not comprise an integrated computing device, may not have lighting assemblies and/or may not have sensors installed therein and/or positioned thereon. In embodiments, a shading element or shade 303 or a shade support 305 may comprise one or more sensors (e.g., environmental sensors 321, directional sensors 322 and/or proximity sensors 323). For example, in embodiments, sensors may be a temperature sensor, a wind sensor, a humidity sensor, an air quality sensor, and/or an ultraviolet radiation sensor. In embodiments, a shading element or shade 303, and/or a shade support assembly 305 may comprise one or more imaging devices 326 (e.g., cameras). In embodiments, a shading support may not include an audio system (e.g., a speaker 353 and/or an audio/video transceiver 352) and may not include lighting assemblies. In embodiments, a shading housing 308 may not include one or more lighting assemblies, one or more imaging devices, one or more sensors, and/or one or more integrated computing devices. In embodiments, an AI shading housing 308 may comprise one or more lighting assemblies, one or more imaging devices, one or more sensors, and/or one or more integrated computing devices.

In embodiments, an AI shading device housing 308 may comprise a computing device 320. In embodiments, an AI shading device housing 308 may comprise one or more processors/controllers 327, one or more memory modules 328, one or more microphones (or audio receiving devices) 329, one or more PAN transceivers 330 (e.g., Bluetooth transceivers), one or more wireless transceivers 331 (e.g., WiFi or other 802.11 transceivers), and/or one or more cellular transceivers 332 (e.g., EDGE transceiver, 4G, 3G, CDMA and/or GSM transceivers). In embodiments, the processors 327, memory 328, transceivers 330 331 332 and/or microphones 329 may be integrated into a computing device 320, where in other embodiments, a single-board computing device 320 (e.g., Raspberry Pi) may not be utilized and processors 327 and/or memory devices 328 may be installed separately within an AI Device Housing 308. In embodiments, one or more memory modules 328 may contain computer-readable instructions 340, the computer-readable instructions 340 being executed by one or more processors/controllers 327 to perform certain functionality. In embodiments, the computer-readable instructions may comprise an artificial intelligence application programming interface (API) 341. In embodiments, an artificial intelligence API 341 may allow communications and/or interfacing between an AI device housing 308 and a third party artificial intelligence (AI) engine housed in a local and/or remote server and/or computing device 350. In embodiments, portions of an AI API 341 may be located in a AI device housing 308 and/portions of an AI API may be located in a remote server and/or computing device 350. In embodiments, an AI API 341 may comprise or include a voice recognition AI API, which may be able to communicate sound files (e.g., analog or digital sound files) to a third party voice recognition AI server 350. In embodiments, a voice recognition AI server may be an Amazon Alexa, Echo, Echo Dot and/or a Google Now server or other third party voice recognition AI servers. In embodiments, an AI engine and/or an AI voice recognition (e.g., computer-readable instructions 340 stored in one or more memories 328 and executed by one or more processors 328 performing AI functions and/or AI voice recognition functions) may be resident on an AI device housing 308 and a third party AI server and/or voice recognition engine may not be utilized.

In embodiments, solar cells and/or solar arrays (not shown) may be mounted on and/or integrated into a shading element or shade 303. In embodiments, solar cells and/or solar arrays may generate solar energy from a sun and convert the solar energy into electrical energy (e.g., voltage and/or current). In embodiments, electrical energy generated by one or more solar cells and/or solar cell arrays may charge and/or provide power to a rechargeable power source (e.g., a rechargeable battery) in an AI device housing 308 (although a rechargeable battery may be positioned within or located within a shading support 305 and/or shading element 303). In embodiments, a rechargeable power source in an AI device housing 308 may provide power to components (e.g., transceivers, processors, and/or microphones, etc.) and/or assemblies in an AI device housing 308, a shading support 305 and/or shading element 303. In embodiments, an AI device housing 308 may also receive power from an AC power source.

In embodiments, an AI device housing 308 may comprise one or more sensors. In embodiments, an AI device housing 308 may comprise one or more environmental sensors 321, one or more directional sensors 322 and/or one or more proximity sensors 323. Although the one or more environmental sensors 321, one or more directional sensors 322 and/or one or more proximity sensors 323 are illustrated as being located on and/or within the AI device housing 308, the sensors identified above may be located on and/or integrated with a shading support 305 and/or a shade element or shade 303. In environments, one or more environmental sensors 321 may comprise one or more air quality sensors, one or more UV radiation sensors, one or more digital and/or analog barometers, one or more temperature sensors, one or more humidity sensors, one or more light sensors, and/or one more wind speed sensors. In embodiments, one or more directional sensors 322 may comprise a digital compass, a compass, a GPS receiver, a gyroscope and/or an accelerometer.

In embodiments, an environmental sensor 321 may comprise an air quality sensor. In embodiments, an air quality sensor may provide ozone measurements, particulate matter measurements, carbon monoxide measurements, sulfur dioxide measurements and/or nitrous oxide measurements. In embodiments, an air quality sensor may provide allergen measurements. Ozone leads to intelligent readings to tell an individual whether or not to go inside. In embodiments, an air quality sensor may communicate measurements and/or readings from an air quality sensor and may communicate these measurements to an AI Device housing processor 327. In embodiments, a processor 327, executing computer readable instructions 340 stored in memory 328, may receive air quality sensor measurements, analyze the measurements, store the measurements and/or cause AI device and shading system assemblies and/or components to react to air quality measurements. In embodiments, for example, if an air quality is too low, e.g., as compared to an existing threshold, one or more processors 327 may communicate commands, instructions and/or signals to an audio system 353 to alert a user of unsafe conditions by reproducing an audible sound on a speaker. In embodiments, for example, ozone measurements from an air quality sensor may be utilized to determine an amount of time an individual should be outside, and this amount of time may be communicated to an individual via a sound system (communicated audibly), via a display and/or monitor (displayed visually), and/or wirelessly to an external computing device.

In embodiments, an AI device housing 308 may comprise an ultraviolet (UV) radiation sensor. In embodiments, a UV radiation sensor may provide discrete radiation band measurements, including, but not limited to UVB, radiation, UVA radiation, Infrared lighting, or a combination of any and all of these radiation measurements. In embodiments, a UV radiation sensor may communicate these measurements to a processor 327. In embodiments, a processor 327 and computer-readable instructions 340 executed by the processor 327, may analyze received UV radiation measurements. In embodiments, a processor 327 and computer-readable instructions 340 executed by the processor 327 may utilize UV radiation measurements received to determine and/or calculate an amount of time an individual should be outside, and this amount of time may be communicated to an individual via a sound system 353 and/or 352 (communicated audibly), via a display and/or monitor, and/or wirelessly to an external computing device.

In embodiments, an environmental sensor 321 in an AI device housing may comprise a digital barometer. In embodiments, a digital barometer may provide, measure, and/or display complex atmospheric data more accurately and quickly than prior barometers. Many digital barometers display both current barometric readings and previous 1-, 3-, 6-, and 12-hour readings in a bar chart format, much like a barograph. They also account for other atmospheric readings such as wind and humidity to make accurate weather forecasts. In embodiments, a digital barometer may capture atmospheric data measurements and communicate these measurements to a processor 327. In embodiments, for example, computer-readable instructions 140 executed by processor 327 may receive digital barometer measurements (e.g., altitude measurements), analyze and/or process these measurements, and determine necessary movements or actions for components and/or assemblies of an AI device and shading system 300. In embodiments, for example, computer-readable instructions 340 executed by processor 327 may receive digital barometer measurements and generate a weather forecast for an area being served by an AI device and shading system 300.

In embodiments, an environmental sensor 321 may comprise a temperature sensor. In embodiments, a temperature sensor may generate and provide a temperature reading or measurement for an environment where an AI device and shading system 300 is located. In embodiments, a temperature sensor may communicate these measurements to a processor 327. In embodiments, computer-readable instructions 340 executed by a processor 327 may receive temperature measurements, analyze the temperature measurements, and/or, determine actions that should be provided to components and/or assemblies of an AI device and shading system. In embodiments, for example, computer-readable instructions executed by a processor may determine and/or calculate an amount of time an individual should be outside, and this amount of time may be communicated to an individual via a sound system 352 or 353 (communicated audibly), via a display and/or monitor, and/or wirelessly to an external computing device.

In embodiments, an environmental sensor may comprise a humidity sensor. In embodiments, a humidity sensor may capture and generate humidity measurements in an environment where an AI device and shading system 300 is located. In embodiments, a humidity sensor may communicate these measurements to a processor 327. In embodiments, computer-readable instructions 340 executed by a processor may receive humidity measurements, analyze humidity measurements and determine actions that may be taken by components and/or assemblies of an AI device and shading system 300. In embodiments, for example, computer-readable instructions 340 executed by a processor 327 may be utilized to determine and/or calculate an amount of time an individual should be outside, and this amount of time may be communicated to an individual via a sound system (communicated audibly), via a display and/or monitor, and/or wirelessly to an external computing device. In embodiments, computer-readable instructions 340 executable by a processor may receive humidity sensor readings and/or temperature sensor readings and determine that 1) an AI Device housing should be turned off because the environment is too hot or humid or 2) a shade element 303 should be deployed to provide shade to the AI device housing. In embodiments, computer-readable instructions 340 executable by a processor 327 may generate commands, instructions and/or signals and communicate the same to a shading element control system (e.g., a motor controller, a motor and/or driving system) to deploy a shade element 303.

In embodiments, an environmental sensor 321 may comprise a wind sensor. In embodiments, a wind speed sensor may capture wind speed and/or wind direction, generate wind speed and/or wind direction measurements at an AI device and shading system. In embodiments, a wind sensor may communicate these measurements to a processor 327. In embodiments, computer-readable instructions 340 executable by a processor 327 may receive wind speed measurements, analyze and/or process these measurements, and determine necessary actions and/or movements by components and/or assemblies of an AI device and shading system 300. In embodiments, computer-readable instructions 340 executable by a processor 327 may communicate commands, signals, and/or instructions to a shading element control system (e.g., a motor controller, a motor and/or driving system) to retract a shade element 303 due to high wind conditions. In embodiments, for example, if a wind speed is higher than a predetermined threshold, computer-readable instructions 340 executable by a processor 327 may communicate commands, instructions, and/or signals to one or more motor controllers to cause a shading element be retracted and moved to a rest position.

In embodiments, an AI device and housing 300 may comprise one or more digital cameras or imaging devices and/or analog imaging devices 326. In embodiments, one or more cameras 326 may comprise an optical system and/or an image generation system. In embodiments, image devices 326 may display images and/or videos on a screen immediately after being captured. In embodiments, one or more image devices 326 may store and/or delete images, sound and/or video from a memory associated with an imaging device 326. In embodiments, one or more imaging devices 326 may capture, record and/or moving videos with or without sound. In embodiments, one or more imaging devices 326 may also incorporate computer-readable and computer-executable instructions which, which when retrieved from a nonvolatile memory, loaded into a memory, and executed by a processor, may crop and/or stitch pictures, and/or potentially perform other image editing on captured images and/or video. For example, image stitching or photo stitching is the process of combining multiple photographic images with overlapping fields of view to produce a segmented panorama and/or high-resolution image. In embodiments, image stitching may be performed through the use of computer software embodied within an imaging device 326. In embodiments, an imaging device 326 may also internally perform video stitching. In embodiments, other devices, components and/or assemblies of imaging devices 326 or of an AI device housing 308 may perform image stitching, video stitching, cropping and/or other photo editing. In embodiments, computer-readable instructions 140, may be executable by a processor 327 in an AI device housing 308 may perform image stitching, video stitching, cropping and/or other photo editing.

In embodiments, imaging devices 326 (e.g., digital cameras) may capture images of an area around, surrounding, and/or adjacent to AI devices with a shading system 300. In embodiments, an AI device housing 308 may comprise one or more imaging devices 326 (e.g., cameras) mounted thereon or integrated therein. In embodiments, a shading support 305 and/or a shade element 303 may comprise one or more imaging devices 326 (e.g., cameras). In embodiments, an AI device and shading system with more than one imaging device 327 may allow image, video and/or sound capture for up to 360 degrees of an area surrounding, around and/or adjacent to an AI device and shading system 300. In embodiments, computer-readable instructions 340 executable by a processor 327 may stitch and/or combine images and/or videos captured by one or more imaging devices 326 to provide a panoramic image of the area. The ability of having multiple imaging devices to allows a benefit of panoramic image capture and not just an area where an imaging device is initially oriented. In embodiments, one or more imaging devices 326 may have one or more image capture resolutions (e.g., 1 Megapixel (MP), 3 MP, 4 MP, 8 MP, 13 MP and/or 38 MP) that are selectable and/or adjustable. In embodiments, one or more imaging devices may also be located on a top portion of a shading element 303 and/or shading support 305 In embodiments, if an imaging device 326 is located on a top portion of an AI device with shading system 300 (e.g., a shading element 303 and/or shading support 305), images, sounds and/or videos may be captured at a higher level than ground level. In addition, an imaging device located on a top portion of an AI device and shading system may capture images, sounds, and/or videos of objects in a sky or just of a horizon or sky. For example, in embodiments, an imaging device 326 located on a top portion may capture images of mountains and/or buildings that are in a skyline. This may be beneficial in situations where there is a fire in the mountain or an issue with a building or someone wants to monitor certain aspects of a building (e.g., if certain lights are on). Further, one or more imaging devices 326 located on a top portion of an AI device with shading system may capture images, sounds, and/or videos of a night time sky (e.g., stars). In addition, one or more imaging device 326 located on a top portion of an AI device with shading system 300 may capture images, sounds, and/or videos of objects moving and/or flying in the sky and/or horizon.

In embodiments, one or more imaging devices 326 may be activated by messages, signals, instructions and commands. In embodiments, components and/or assemblies of an AI device and shading system 300 (e.g., a processor 327, computer-readable instructions 340 executed by a processor 327, and/or a proximity sensor 323) may communicate messages, signals, instructions and/or commands to the one or more imaging devices 326 to activate, turn on, change modes, turn off, change focus and/or change capture image resolution. In addition, messages, signals, instructions, and/or commands may activate one or more imaging devices 326 and software stored therein may perform image stitching, video stitching, image editing and/or cropping. In embodiments, a processor 327 and/or wireless transceiver 330-332 in an AI device with shading system 300 may communicate messages, signals, instructions and/or commands to activate one or more imaging devices in order to perform functions and/or features described above (which may include security system functions). In embodiments, a computing device, separate from an AI device with shading system 300, may communicate messages, signals, instructions and/or commands to activate one or more imaging devices in order to perform functions and/or features described above.

In embodiments, one or more imaging devices 326 may communicate captured images, sounds and/or videos to a processor 327 of an AI shading device and these images, sounds and/or videos may be stored in one or more memories 328 of an AI shading device. In embodiments, one or more imaging devices 326 may communicate captured images, sounds and/or videos to a memory of a remote computing device separate from a processor and/or controller 327 in an AI shading device housing 308. In embodiments, for example, one or more imaging devices 326 may communicate captured images, sounds and/or videos to an external computing device (directly for storage and/or streaming). In embodiments, one or more imaging devices 326 may communicate captured images, sounds, and/or videos utilizing wired (e.g., utilizing Ethernet, USB, or similar protocols and transceivers) and/or wireless communication protocols (e.g., utilizing 802.11 wireless communication protocols and transceivers).

In embodiments, an AI device housing 308 may comprise one or more of imaging devices 326 and an infrared detector. In embodiments, an infrared detector may comprise one or infrared light sources and an infrared sensor. In embodiments, an infrared detector may generate a signal indicating that an object is located within an area being monitored or viewed by an infrared detector. In embodiments, if an infrared detector generates a signal indicating that an object (and/or individual) is present, one or more imaging devices 326 may be activated and begin to capture images and/or video, with or without sound, and communicate captured images and/or video, with or without sound, to a separate computing device and/or a processor 327. In embodiments, if an infrared detector generates a signal indicating that an object (and/or individual) is present, a lighting assembly (e.g., LED lights) may also be activated and lights may be directed in an area surrounding an AI device and shading system 300 and/or directly to an area where an object is detected. In embodiments, one or more imaging devices 326 and/or one or more lighting assemblies may be activated, which results in better images and/or video of an area surrounding an AI device and shading system 300. This is yet another example of how an AI device and shading system provides additional benefits of not only capturing images of its surrounding area but also being utilized as a security device for an environment in which an intelligent shading object is located.

In embodiments, an AI device housing 308 may comprise or more imaging devices 326 which may be thermal imaging cameras. In embodiments, thermal imaging cameras may include a special lens, an infrared light, and an array of infrared-detector elements. In embodiments, an AI device and shading system 300 may comprise an infrared light, a lens and a phased-array of infrared-detector elements. In embodiments, a thermal imaging camera comprises a special lens may focus on infrared light emitted by all objects within an area surrounding and/or adjacent to an AI device and shading system 300. In embodiments, a focused light may be scanned by a phased array of infrared-detector elements. In embodiments, one or more detector elements may generate a very detailed temperature pattern, which may be referred to as a thermogram. In embodiments, a detector array may take a short amount of time (e.g., about one-thirtieth of a second) to obtain temperature information to make a thermogram. In embodiments, information may be obtained from a plurality of points in a field of view of a detector array. In embodiments, detector elements from a thermogram may be converted and/or translated into electric impulses and electrical impulses may be sent to a signal-processing unit. In embodiments, a signal-processing unit may be a PCB with a dedicated chip that translates received information (electrical impulses) into thermal images and/or thermal video. In embodiments, a signal-processing unit may communicate thermal images and/or thermal video either to a display (e.g., a display and/or a display on a computing device communicating with an AI device and shading system 300). In embodiments, a signal-processing unit of a thermal imaging camera may communicate thermal images and/or thermal video to a processor for analysis, storage and/or retransmission to an external computing devices. In embodiments, a thermal image may appear as various colors depending on and/or corresponding to an intensity of an infrared image. In embodiments, a thermal imaging camera allows additional benefits of not having to activate a lighting assembly in order to capture images and/or videos of an area surrounding an AI device and shading system 300. In addition, by not activating a lighting assembly, an intruder or moving object may not be aware that an imaging device 326 may be capturing an image or video of an area where an intruder or object is located. In embodiments, an infrared detector may activate a thermal imaging device upon detection of movement. In embodiments, a thermal imaging device may activate on its own due to movement of an intruder and/or object, or may be periodically or continuing capturing images and/or video.

In embodiments, an AI device and shading system 300 may comprise a proximity sensor 323. In embodiments, a proximity sensor 323 may be able to detect a presence of nearby objects, (e.g., people or other physical objects) without any physical contact between a sensor and an object.

In embodiments, a proximity sensor 323 be located on and/or mounted on an AI device housing 308. In embodiments, a proximity sensor 323 may be located on and/or mounted on other printed circuit boards or may be a stand-alone component. In embodiments, a proximity sensor 323 may be located within and/or mounted on a shading support 305 and/or a shading element 303. In embodiments, a proximity sensor 323 may generate measurements and/or signals, which may be communicated to a processor/controller 327. In embodiments, computer-readable instructions 340, which are fetched from memory 328 and executed by a processor 327, may perform and/or execute a proximity process or method. In embodiments, for example, a proximity process may comprise receiving measurements and/or signals from a proximity sensor 323 indicating an object and/or person may be located in an area where an AI device and shading system is deployed, going to be deployed and/or extended, and/or towards where a component of an AI device and shading system 300 may be moving. For example, if an individual is located in an area where a shading support 305 may be deployed and/or extended, a proximity sensor 323 may transmit a signal or measurement indicating an object may be an obstruction to movement of a shading support 305. In embodiments, computer-readable instructions 340 executable by a processor 327 may receive and/or analyze a proximity measurement and determine an object may be an obstacle. In embodiments, a proximity signal and/or command may also identify a location of an object (e.g., obstacle) in relation to a proximity sensor 323 and/or some reference location. In embodiments, computer-readable instructions 340 executable by a processor 327 may generate and/or communicate a driving signal, command, and/or instruction that instructs an AI device and shading system 300 not to deploy and/or open. In embodiments, this may also work in the opposite direction, where if a proximity sensor 323 does not determine that an object is within an AI device and shading system area, then a proximity sensor signal may not be communicated to the processor/controller 327.

In embodiments, a proximity sensor 323 may identify location of a person relative to moving components of an AI device and shading system 100. Utilization of proximity sensors 322 on AI devices and shading system provides an advantage over AI devices due to detection of objects, individuals, animals and/or other devices. For example, based on proximity sensor measurements, detections and/or values, an AI device and shading system 300 may move a position of one or more assemblies or modules (e.g., shading support, shading element, and/or other components) to prevent problematic conditions or situations where objects and/or individuals may damage components and/or assemblies of an AI device and shading system. For example, based on proximity sensor 323 measurements or values, a shading element or shading support may be retracted.

In embodiments, proximity sensors 323 may comprise one or more laser sensors, light sensors, line of sight sensors, ultrasound or ultrasonic sensors, infrared or other light spectrum sensors, radiofrequency sensors, time of flight sensors, and/or capacitive sensors. In embodiments, a proximity sensor 323 may emit an electromagnetic field or a beam of electromagnetic radiation (infrared, for instance), and may measure changes in a field surrounding an object or measure changes in a return signal. In embodiments, a laser sensor may comprise through-beam sensors, retro-reflective sensors and/or diffuse reflection sensors. In embodiments, a laser light returned may be measured against an original signal to determine if an object and/or person is present. In embodiments, laser light may consist of light waves of the same wave length with a fixed phase ratio (coherence), which results in laser systems having almost parallel light beam. Thus, movements may be detected via small angles of divergence in returned laser light. In embodiments, a light or photoelectric sensor may be utilized as a proximity sensor 323 and may transmit one or more light beams and may detect if any return reflected light signals are present. In embodiments, a photoelectric sensor may be a diffusion and/or retro-reflective and/or diffusion sensor. In embodiments, diffusion sensor emitters and receivers may be located in a same housing. In embodiments, a target may act as a reflector, so that detection may occur if light s reflected off a disturbance object. In embodiments, an emitter sends out a beam of light (most often a pulsed infrared, visible red, or laser) that diffuses in all directions, filling a detection area. In embodiments, a target may enter an area and may deflects part of a beam back to a receiver. In embodiments, a photoelectric sensor may detect a target and an output signal may be turned on or off (depending upon whether a photoelectric sensor is light-on or dark-on) when sufficient light falls on a receiver of a photoelectric sensor.

In embodiments, a proximity sensor 323 may be an inductive sensor which may detect movements in metallic and/or ferrous objects. In embodiments, inductive sensors may detect ferrous targets, for example, a metal (e.g., steel) thicker than one millimeter. In embodiments, a proximity sensor 323 may be a capacitive sensor. In embodiments, a capacitive sensor may detect both metallic and/or non-metallic targets in powder, granulate, liquid, and solid form. In embodiments, a proximity sensor 323 may be an ultrasonic sensor. In embodiments, an ultrasonic diffuse proximity sensor may employ a sonic transducer, which emits a series of sonic pulses, then listens for their return from a reflecting target. In embodiments, once a reflected signal is received, sensor signals may be output to a control device. In embodiments, an ultrasonic sensor may emit a series of sonic pulses that bounce off fixed, opposing reflectors, which may be any flat surface. In embodiments, sound waves may return to a sensor within a user-adjusted time interval and if sound waves do not, an object may be obstructing a ultrasonic sensing path and an ultrasonic sensor may output signals accordingly. I embodiments, a proximity sensor 323 may be a time of flight sensor. In embodiments, time of flight optical sensors may determine displacement and distance by measuring a time it takes a light to travel from an object (intelligent shading system) to a target and back. In embodiments, a time of flight sensor may be a time of flight camera, which is a range imaging camera. In embodiments, a time-of-flight camera (ToF camera) may resolves distance based on speed of light, by measuring a time-of-flight of a light signal between a camera and a subject and/or target for each point of an image.

In embodiments, an AI device housing 308 may comprise one or more directional sensors 322. In embodiments, a directional sensor 322 may also comprise a GPS transceiver, a compass, a magnetometer, a gyroscope and an accelerometer. In embodiments, a shading support 305 and/or a shading element 303 may comprise one or more directional sensors (e.g., GPS transceiver, a compass, a gyroscope and an accelerometer). In embodiments, directional sensors may provide orientations and/or locations of an AI device and shading system 300 as well as different components of an AI device and shading system 300. In embodiments, computer-readable instructions 340 executable by a processor 327 may request an initial desired orientation for different assemblies and/or components of an AI device and shading system and communicate such directional request to one or more directional sensors 322. In embodiments, one or more gyroscopes may be utilized to determine, calculate and/or detect an angle of a support assembly 305 with respect to an AI device housing 308 and/or detect an angle of a support assembly 305 with respect to an shading element 303 (e.g., determine a current elevation of different assemblies of an AI device and shading system 300). In embodiments, one or more accelerometers may also be utilized along with one or more gyroscopes to determine, calculate and/or detect angles discussed above.

In embodiments, computer-readable instructions 340 executed by a processor 327 may communicate a directional request to one or more directional sensors 322. In embodiments, one or more directional sensors 322 (e.g., compass and/or magnetometer) may determine movement and/or a relative position of an AI device with shading system 300 (or other components or assemblies) with respect from a reference direction. In embodiments, for example, a directional measuring sensor 322 (e.g., compass, digital compass and/or magnetometer) may determine relative movement and/or a relative position with respect to true north. In embodiments, for example, a compass and/or a digital compass may determine movement and/or a relative position with respect to true north. In embodiments, these measurements may be referred to as heading measurements. In embodiments, a directional measuring sensor 322 may communicate and/or transfer heading measurements to a processor 127, where these heading measurements may be stored in a memory 128.

In embodiments, in response to a directional orientation request by computer-readable instructions 340 executed by a processor 327, a GPS transceiver may measure a geographic location of an AI device and shading system 300 (and associated assemblies) and may communicate such geographic location measurement to a processor 327, which may transfer these heading measurements into a memory 328. In embodiments, a GPS transceiver may determine latitude and/or longitude coordinates and communicate such latitude and/or longitude coordinates to a processor 327. In embodiments, a clock may capture a time of day and communicate and/or transfer such time measurement to a processor, which may store the time measurement in a memory 328.

In embodiments, computer-readable instructions 140 executed by a processor 327 stored in a memory 328 may include algorithms and/or processes for determining and/or calculating a desired azimuth and/or orientation of an AI device and shading system (and associated assemblies) depending on a time of day. In an alternative embodiment, a portable computing device executing computer-readable instructions on a processor (e.g., a SMARTSHADE software app) and located in a vicinity of an AI device and shading housing 300 may retrieve coordinates utilizing a mobile computing device's GPS transceiver and may retrieve a time from a mobile computing device's processor clock and provide these geographic location measurements and/or time to a processor 327 in an AI shading housing 308.

In embodiments, computer-readable instructions 340 stored in a memory 328 may be executed by processor 327 and may calculate a desired AI device and shading system 300 (and associated assemblies such as shading support 305 and/or shading element 303) angle and/or azimuth angle utilizing received geographic location measurements, heading measurements, and/or time measurements. In embodiments, computer-readable instructions 340 stored in a memory 328 may compare 360 desired elevation angle measurements and azimuth angle measurements to a current elevation angle and azimuth angle of the AI device and shading system 300 (and associated assemblies such as shading support 305 and/or shading element 303) (calculated from gyroscope measurements, accelerometer measurements, and/or both) to determine movements that a shading support 305 and/or shading element 303 may make in order to move to a desired orientation. In embodiments, executed computer-readable instructions may calculate an azimuth adjustment measurement to provide to an azimuth motor and/or an elevation adjustment measurement to provide to a motor assembly.

In embodiments, a shading device housing 308 may comprise one or more microphones 329 to capture audio, and/or audible or voice commands spoken by users and/or operators of shading systems 300. In embodiments, computer-readable instructions 340 executed by one or more processors 327 may receive captured sounds and create analog and/or digital audio files corresponding to spoken audio commands (e.g., open shading system, rotate shading system, elevate shading system, select music to play on shading system, turn one lighting assemblies). In embodiments, an AI API 341 may communicate such generated audio files to an external AI server 350. In embodiments, for example, an AI API 341 in an AI shading device housing 108 (or a portion of an AI API 341 executing in an AI shading device housing 308) may communicate generated audio files to external AI servers 350 via and/or utilizing one or more PAN transceivers 330, one or more wireless local area network transceivers 331, and/or one or more cellular transceivers 332. In other words, communications with an external AI server 350 may occur utilizing PAN transceivers 330 (and protocols). Alternatively, or in combination with, communications with an external AI server 350 may occur utilizing a local area network (802.11 or WiFi) transceiver 331. Alternatively, or in combination with, communications with an external AI server 350 may occur utilizing a cellular transceiver 332 (e.g., utilizing 3G and/or 4G or other cellular communication protocols). In embodiments, an AI shading device housing 308 may utilize or comprise more than one microphone 329 to allow capture of voice commands from a number of locations and/or orientations with respect to an AI device and shading system 300 (e.g., in front of, behind an AI device and shading system, and/or at a 45 degree angle with respect to a support assembly 305).

In embodiments, a mobile computing device 310 may communicate with an AI Device and shading system 300. In embodiments, a user and/or operator may communicate with a mobile computing or communications device 310 by a spoken command into a microphone of a mobile computing device 310. In embodiments, a mobile computing or communications device 310 communicates a digital or analog audio file to a processor 327 and/or AI API 341 in an AI shading device housing 308 (e.g., utilizing one or more of transceivers (e.g., PAN transceiver 330; wireless or WiFi transceiver 331 and/or cellular transceiver 332). In embodiments, a mobile computing or communications device 310 may also convert the audio file into a textual file for easier conversion by either an AI API 341 or an AI engine in a an external AI server or computing device 350. In embodiments, an AI engine may also be resident within one or more memories 328 of an AI shading device housing 308 (e.g., computer-readable instructions 340 executed by a processor 327)

FIG. 3 describes an AI device and shading system 100 having a shading element or shade 303, shading support 305 and/or an AI shading device housing 308. An AI shading device housing 308 such as the one described above may be attached to any shading system and may provide artificial intelligence functionality and services for such shading systems. In embodiments, a shading system may be an autonomous and/or automated shading system having an integrated computing device, sensors and other components and/or assemblies, but may benefit from having and may have artificial intelligence functionality and services provided utilizing an AI API and/or an AI engine stored in a memory of an AI shading device housing.

In embodiments, an AI device housing may comprise an audio transceiver 353 and/or a sound reproduction device 352 (e.g., speaker). In embodiments, audio files (e.g., digital and/or analog digital files) may be communicated to an audio transceiver 353 and further to a sound reproduction device 352 for audible reproduction. Thus, communications from an AI engine (e.g., feedback commands and/or instructions) may be communicated to a transceiver 353 and/or speaker for audible feedback. In embodiments, music and/or audio files communicated from an external server and/or from local memory may be communicated to an audio transceiver 353 and/or speaker 352 for reproduction to a user and/or operator.

Figure 3B:
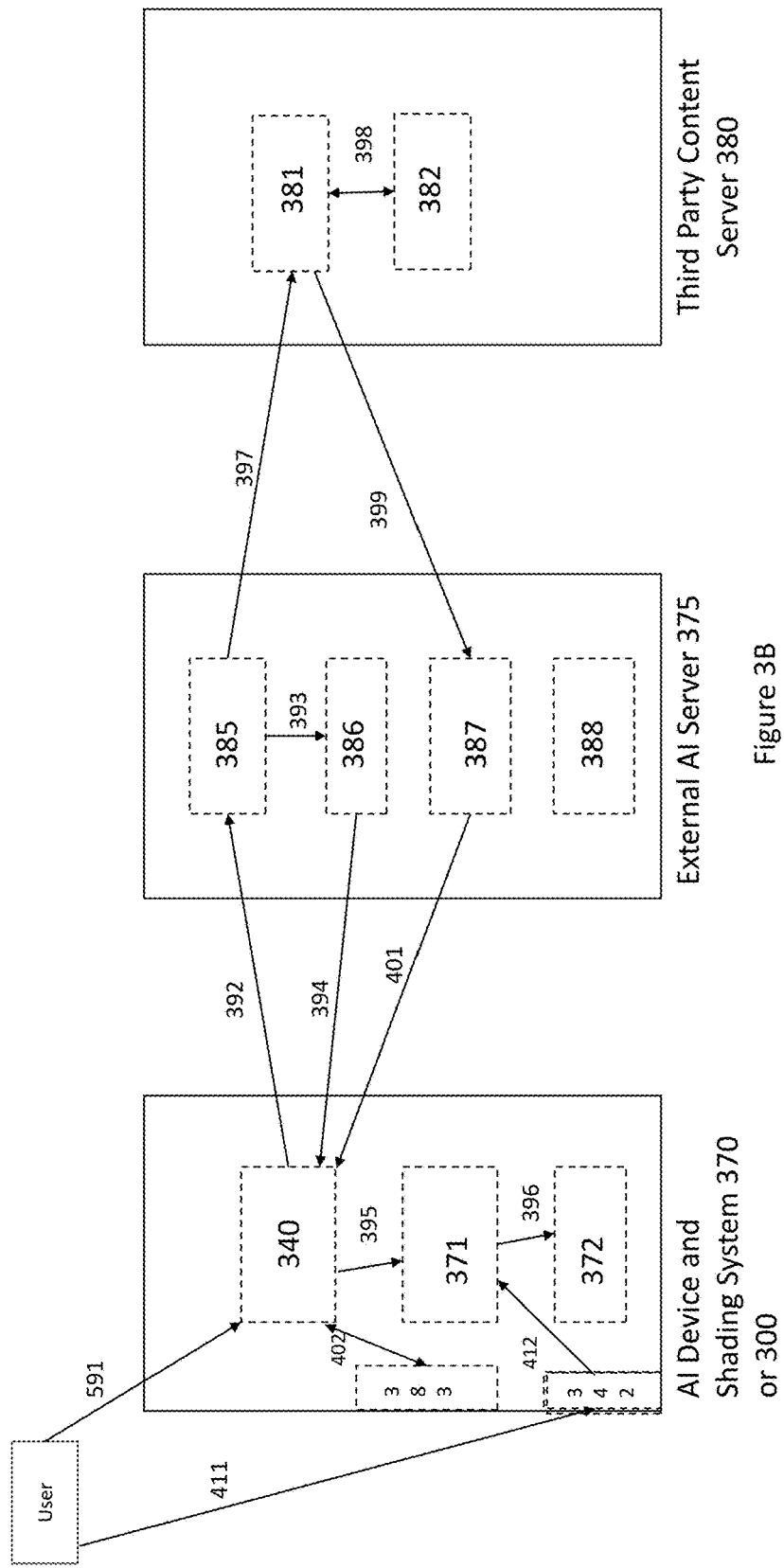
FIG. 3B illustrates a block and dataflow diagram of communications between an AI device and shading system according to embodiments.

FIG. 3B illustrates a block and dataflow diagram of communications between an AI device and shading system according to embodiments. An AI Device and shading system 300 may communicate with an external AI server 375 and/or additional content servers 380 via wireless and/or wired communications networks. In embodiments, a user may speak 391 a command (e.g., turn on lights, or rotate shading system) which is captured as an audio file and received at an AI device and shading system 370. In embodiments, an AI API 341 in an AI device and shading system 300 or 370 may communicate and/or transfer 392 an audio file (utilizing a transceiver—PAN, WiFi/802.11, or cellular) to an external or third-party AI server 375. In embodiments, an external AI server 375 may comprise a voice recognition engine or module 385, a command engine module 386, a third party content interface 387 and/or third party content formatter 388. In embodiments, an external AI server 375 may receive 392 one or more audio files and a voice recognition engine or module 385 may convert received audio file to a device command (e.g., shading system commands, computing device commands) and communicate 393 device commands to a command engine module or engine 386. In embodiments, if a voice command is for operation of an AI device and shading system 370, a command engine or module 386 may communicate and/or transfer 394 a generated command, message, and/or instruction to an AI device and shading system 370. In embodiments, an AI device and shading system 300 or 370 may receive the communicated command, communicate and/or transfer 395 the communicated command to a controller/processor 371. In embodiments, the controller/processor 371 may generate 396 a command, message, signal and/or instruction to cause an assembly, component, system or devices 372 to perform an action requested in the original voice command (open or close shade element, turn on camera and/or sensors, activate solar panels).

In embodiments, a user may request actions to be performed utilizing a AI device and shading system's microphones and/or transceivers that may require interfacing with third party content servers (e.g., NEST, e-commerce site selling sun care products, e-commerce site selling parts of AI devices and shading systems, communicating with online digital music stores (e.g., iTunes), home security servers, weather servers and/or traffic servers). For example, in embodiments, an AI device and shading system user may request 1) traffic conditions from a third party traffic server; 2) playing of a playlist from a user's digital music store accounts; 3) ordering a replacement skin and/or spokes/blades arms for a shading system. In these embodiments, additional elements and steps may be added to previously described method and/or process.

For example, in embodiments, a user may speak 391 a command or desired action (execute playlist, order replacement spokes/blades, and/or obtain traffic conditions from a traffic server) which is captured as an audio file and received at an AI API 341 stored in one or more memories of an AI device housing 300 or 370. As discussed above, in embodiments, an AI API 541 may communicate and/or transfer 392 an audio file utilizing a shading system's transceiver to an external AI server 375. In embodiments, an external AI server 375 may receive one or more audio files and a voice recognition engine or module 385 may convert 393 received audio file to a query request (e.g., traffic condition request, e-commerce order, retrieve and stream digital music playlist).

In embodiments, an external AI server 375 may communicate and/or transfer 397 a query request to a third party server (e.g., traffic conditions server (e.g., SIGALERT or Maze), an e-commerce server (e.g., a RITE-AID or SHADECRAFT SERVER, or Apple iTunes SERVER) to obtain third party goods and/or services. In embodiments, a third party content server 380 (a communication and query engine or module 581) may retrieve 398 services from a database 382. In embodiments, a third party content server 380 may communicate services queried by the user (e.g., traffic conditions or digital music files to be streamed) 399 to an external AI server 375. In embodiments, a third party content server 380 may order requested goods for a user and then retrieve and communicate 399 a transaction status to an external AI server 375. In embodiments, a content communication module 387 may receive communicated services (e.g., traffic conditions or streamed digital music files) or transaction status updates (e.g., e-commerce receipts) and may communicate 401 the requested services (e.g., traffic conditions or streamed digital music files) or the transaction status updates to an AI device and shading system 300/370. Traffic services may be converted to an audio signal, and an audio signal may be reproduced utilizing an audio system 383. Digital music files may be communicated and/or streamed 403 directed to an audio system 383 because there is no conversion necessary. E-commerce receipts may be converted and communicated to speaker 383 for reading aloud. E-commerce receipts may also be transferred to computing device in an AI device and shading system 370 or 300 for storage and utilization later.

In embodiments, computer-readable instructions in a memory module of a an AI device and shading system 370 may be executed by a processor and may comprise a voice recognition module or engine 342 and in this embodiment, voice recognition may be performed at an AI device and shading system 300 or 370 without utilizing a cloud-based server. In embodiments, an AI device and shading system 370 may receive 411 the communicated command, communicate and/or transfer 412 the communicated command to a controller/processor 371. In embodiments, the controller/processor 371 may generate and/or communicate 396 a command, message, signal and/or instruction to cause an assembly, component, system or device 372 to perform an action requested in the original voice command.

Figure 4:
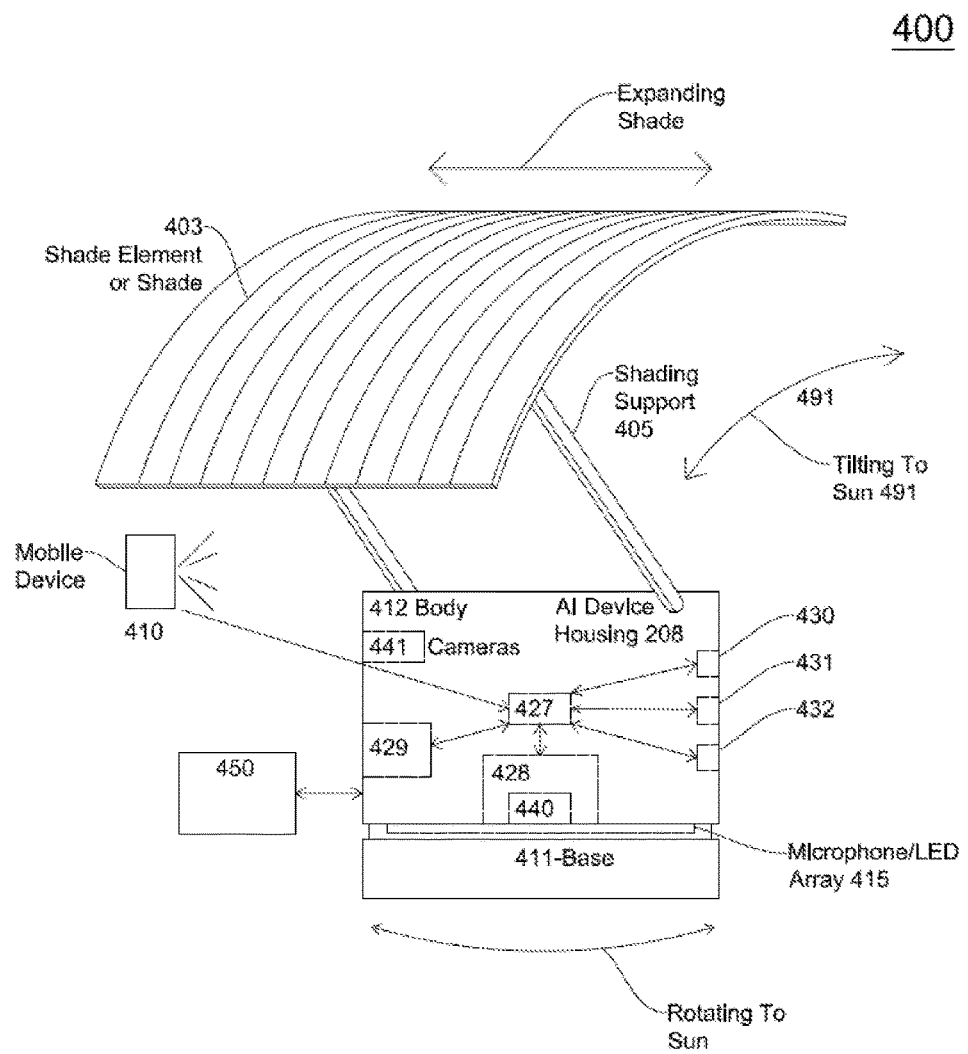
FIG. 4 illustrates an AI device and shading system with an adjustable shading support according to embodiments.

FIG. 4 illustrates an AI device and shading system with an adjustable shading support according to embodiments. In embodiments, an AI and shading system 400 comprises a shading element or a plurality of shading elements 403, one or more shading supports 405 and/or an AI device housing 408. In embodiments, an AI device housing 408 may comprise an upper body 412 and a base assembly 411. In embodiments, an AI device housing 408 may comprise a microphone and/or LED array 415. In embodiments, an AI device housing 408 may comprise one or more processors 427, one or more PAN transceivers 430, one or more WiFi or 802.11 transceivers 431, and/or one or more cellular transceivers 432 (the operations of which are described above with respect to FIG. 1). In addition, an AI device housing 408 (and/or an AI device and shading system 400) may also include sensors (similar to directional sensors 322, environmental sensors 321 and/or proximity sensors 323 of FIG. 3), an audio receiver and speaker, a computing device although these components and/or assemblies are not shown or illustrated in FIG. 4.

In embodiments, an AI device housing 408 may comprise one or more audio transceivers and one or more speakers 429. In embodiments, audio files, music files, and/or voice files may be communicated to one or more audio transceivers 243 and/or one or more speakers 429 for audio playback. In embodiments, one or more speakers 429 may be a speaker line array where speakers are located at least on each side of an AI device housing to provide sound coverage on each of an AI device housing 408 according to embodiments.

Figure 10:
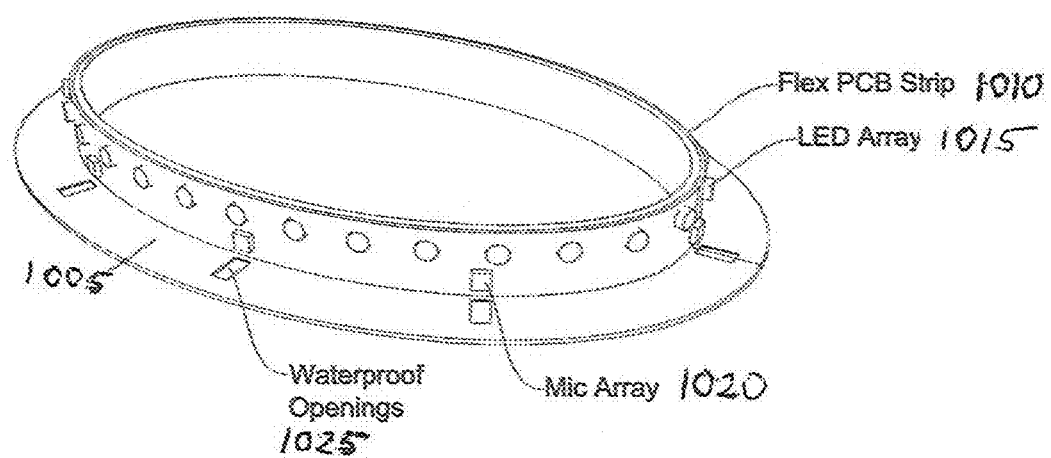
FIG. 10 illustrates a microphone and/or LED array in an AI device housing according to embodiments.

In embodiments, a microphone and/or LED array 1015 may provide sound capture and/or lighting on each side or a number of sides of an AI device housing. In embodiments, as is illustrated in FIG. 10, a microphone and/or LED array may be positioned above a base assembly 1011 of an AI device housing. FIG. 10 illustrates a microphone and/or LED array in an AI device housing according to embodiments. In embodiments, a microphone and/or LED array 1000 may comprise a plastic housing 1005, one or more flexible printed circuit boards (PCBs) or circuit assemblies 1010, one or more LEDs or LED arrays 1015 and/or one or more microphones and/or microphone arrays 1020. In embodiments, a plastic housing 1005 may be oval or circular in shape. In embodiments, a plastic housing 1005 may be fitted around a shaft, a post and/or tube in an AI device housing 108 and 208. In embodiments, a plastic housing 1005 may be adhered to, connected to and/or fastened to a shaft, a post and/or tube. In embodiments, a flexible PCB or housing 1010 may be utilized to mount and/or connect electrical components and/or assemblies such as LEDs 1015 and/or microphones 1020. In embodiments, a flexible PCB or housing 1010 may be mounted, adhered or connected to a plastic housing or ring 1005. In embodiments, a flexible PCB or housing 1010 may be mounted, adhered or connected to an outer surface of a plastic housing or ring 1005. In embodiments, a plastic housing or ring 1005 may have one or more waterproof openings 1025 for venting heat from one or more microphone arrays 1020 and/or one or more LED arrays 1015. In embodiments, a plastic housing or ring 1005 may have one or more waterproof openings for keeping water away and/or protecting one or more microphone arrays 1020 and/or one or more LED arrays 1015 from moisture and/or water. In embodiments, one or LED arrays 1015 may be mounted and/or connected on an outer surface of a flexible PCB strip 1010 and may be positioned at various locations on the flexible PCB 1010 to provide lighting in areas surrounding a shading and AI system. In embodiments, one or more LED arrays may be spaced at uniform distances around a plastic housing 1005 (e.g., or ring housing). In embodiments, one or more microphones or microphone arrays 1020 may be mounted and/or connected to a flexible PCB strip 1010. In embodiments, one or more microphones or microphone arrays 1020 may be positioned at one or more locations around a housing or ring 1005 to be able capture audible sound and/or voice commands coming from a variety of directions. In embodiments, one or more microphones or microphone arrays 1020 may be spaced at set and/or uniform distances around a housing and/or ring 1005.

Figure 9:
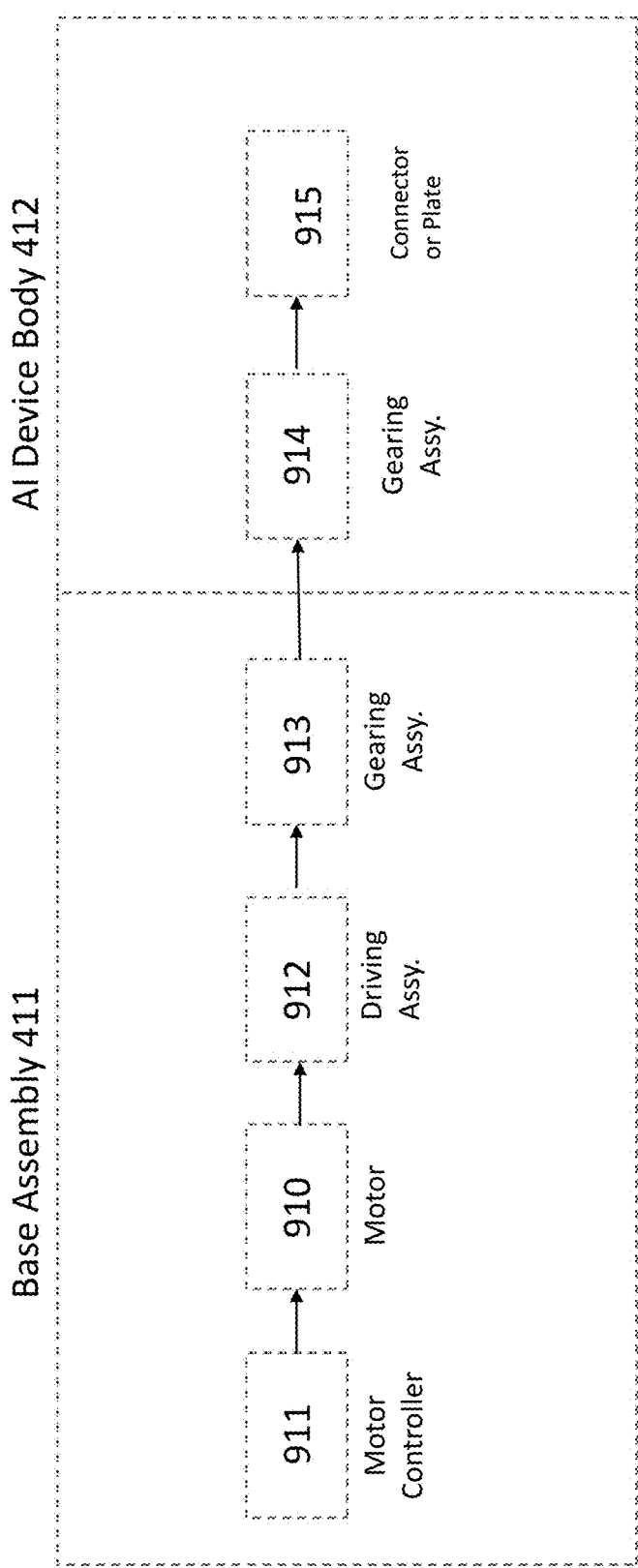
FIG. 9 illustrates an intelligent umbrella/robotic shading system and antennas and motor assemblies according to embodiments.

Referring back to FIG. 4, in embodiments, a base assembly 411 may be stationary and an AI device housing body 412 may rotate about a base assembly 411. In embodiments, as illustrated in FIG. 9, a base assembly 411 may comprise a motor 910, a motor controller 911, a shaft or driving assembly 912 and/or a gearing assembly 913. In embodiments, an AI device housing body 912 may comprise a gearing assembly 914 and/or a connector 915. In embodiments, in response to a command and/or instruction being received by a motor controller 911, a motor controller 911 may communicate a command and/or signal to a motor 910. In response, a motor 910 may be activated and may cause rotation of a shaft or driving assembly 912, which is connected to a gearing assembly 913. In embodiments, rotation of a shaft or driving assembly 912 may cause rotation of a gearing assembly 913. In embodiments, a gearing assembly 913 in a base assembly 411 may cause rotation of a gearing assembly 914 in an AI device housing body 412, which is connected and/or couple to a connector or plate 915 in a AI device housing 408. In embodiments, rotation of a gearing assembly 914 and/or a connector or plate 915 may cause rotation of the AI device housing 408 about a base assembly 411. This provides an advantage over other prior art devices because the AI device housing 408 may move to follow and/or track a sun and thus the shading element or shade 403 may be able to provide protection from the sun and/or heat by moving and/or tracking the sun. Although FIG. 9 illustrates that a motor controller 911, a motor 910, a driving assembly or shaft 912 and/or a gearing assembly 913 in a base assembly 411 and a gearing assembly 914 and/or a connector or plate 915 in a AI device body 412, any of the components may be placed in or be resident in the other assembly (e.g., different components (e.g., gearing assembly 914 and/or a connector or plate 915) may be placed and/or positioned in a base assembly 411 and other components (e.g., motor controller 911, a motor 910, a driving assembly or shaft 912 and/or a gearing assembly 913) may be placed and/or positioned in a AI device body 412. In either configuration, an AI device body 412 may rotate about a base assembly 411, and this may provide additional flexibility in providing protection from the sun and other environmental conditions for the AI device body 412.

Referring back to FIG. 4, a shading support 505 may comprise one or more support arms. For example, as illustrated in FIG. 4, two support arms may be utilized to connect a shading element or shade 403 to an AI device housing 408 (although one, three, four, five or six support arms may also be utilized). In embodiments, a motor assembly may cause one or support arms 405 to move to different positions to protect an AI device housing 408 from heat, sun, rain, hail, snow and/or other environmental elements. In embodiments, movement or one or more shading supports (or support arms) may tilt a shade element or shade 403 towards a sun, such as illustrated by reference number 491 in FIG. 2. In embodiments, a motor controller may receive commands, instructions, messages or signals requesting movement of a shading element or shade 403 and may generate commands and/or signals to cause a motor to turn, a shaft to rotate, and/or a gearing assembly to turn. In embodiments, a gearing assembly may be attached to a shading support 403 and may cause movement of one or more shading supports 405 which in turn moves and/or rotates a shading element or shade 403. In embodiments, a shading element or shade 403 may be expandable. In embodiments, a shading element or shade 403 may one length and/or width in one position (e.g., a rest position) and may expand and have a larger length and/or width in other positions (e.g., when deployed and protecting an AI device housing 408 from a weather or other environmental conditions). This may be referred to as expanding shade.

Figure 5:
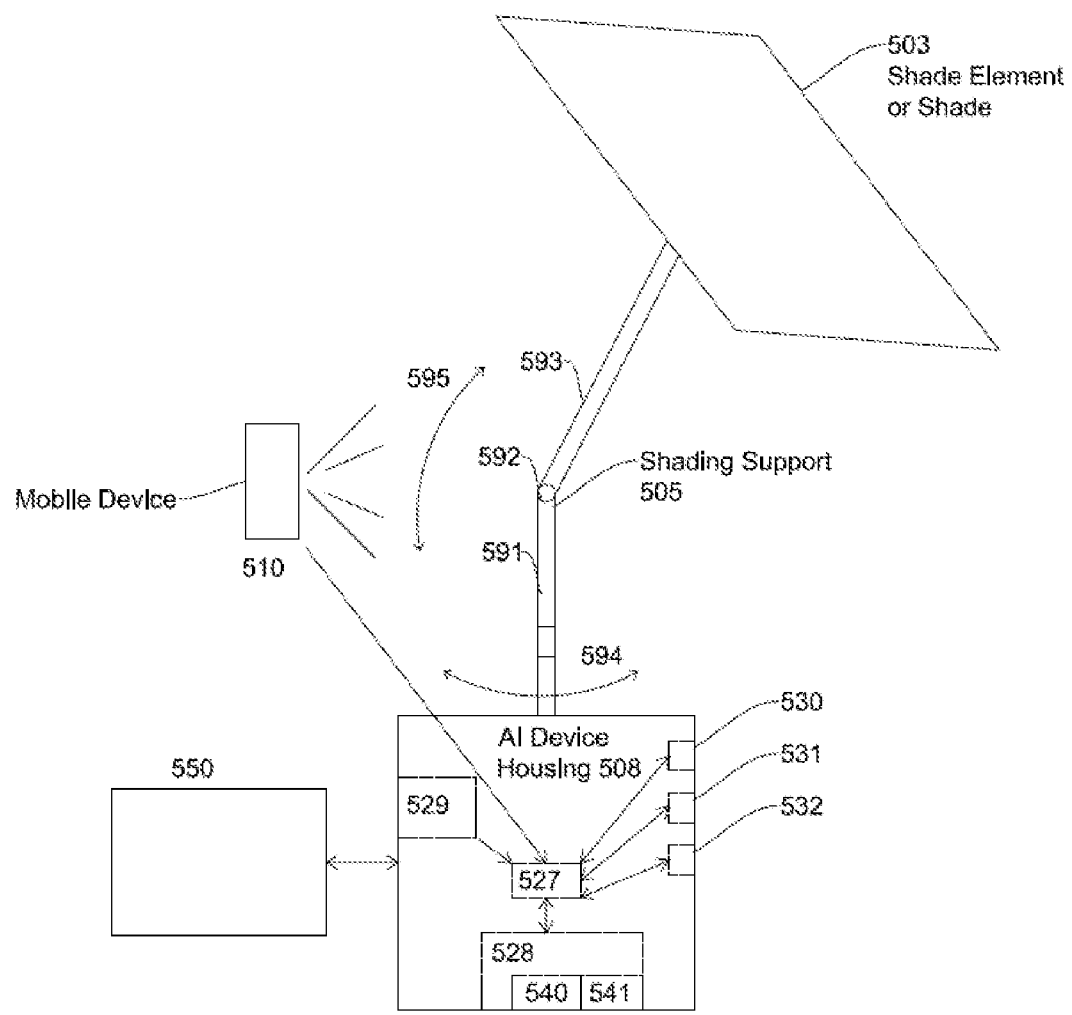
FIG. 5 illustrates an AI Device and Shading System according to embodiments.

FIG. 5 illustrates an AI Device and Shading System according to embodiments. The operation of components (transceivers, cameras, sensors, processors, and/or computer-readable instructions in AI device housing 508 is similar to that as described above with respect to FIGS. 3 and 4. FIG. 5's AI device and shading system 500 comprises a two hinge shading support 505. In embodiments, a two hinge shading support 505 may comprise a first shading support 591, a hinging assembly 592 and a second shading support 593. In embodiments, a first shading support 591 may rotate with respect to an AI device housing 508 as is illustrated by reference number 594 (and thus the shading element or shade 503, the hinging assembly 592 and the second shading support 593 may also rotate with respect to the AI device housing). In embodiments, a second shading support 593 may rotate about a first shading support 591 utilizing a hinging assembly 591. In embodiments, a rotation of a second shading support 593 about a first shading support 591 using a hinging assembly 592 is illustrated by reference number 595.

In embodiments, a first motor assembly comprises a first motor shaft that may rotate in response to activation and/or utilization of a first motor. In embodiments, a first motor shaft may be mechanically coupled (e.g., a gearing system, a friction-based system, etc.) to a force transfer shaft. In embodiments, a first motor shaft may rotate in a clockwise and/or counterclockwise direction and in response, a force transfer shaft may rotate in a same and/or opposite direction. In embodiments, a force transfer shaft may pass may be mechanically coupled to a receptacle in an AI device housing. In response to, or due to, rotation of force transfer shaft in a receptacle in an AI device housing 508, a first support assembly 591 (and thus a shade element or shade 403 plus a hinging assembly 592 and a second support assembly 593) may rotate with respect to the AI device housing 508. In embodiments, a first motor may be coupled to a gearbox assembly. In embodiments, a gearbox assembly may comprise a planetary gearbox assembly. A planetary gearbox assembly may be comprise a central sun gear, a planet carrier with one or more planet gears and an annulus (or outer ring). In embodiments, planet gears may mesh with a sun gear while outer rings teeth may mesh with planet gears. In embodiments, a planetary gearbox assembly may comprise a sun gear as an input, an annulus as an output and a planet carrier (one or more planet gears) remaining stationary. In embodiments, an input shaft may rotate a sun gear, planet gears may rotate on their own axes, and may simultaneously apply a torque to a rotating planet carrier that applies torque to an output shaft (which in this case is the annulus). In embodiments, a planetary gearbox assembly and a first motor may be connected and/or adhered to a first support assembly 591 although resident within the AI device housing. In embodiments, a motor and gearbox assembly may be resident within an AI device housing 508. In embodiments, an output shaft from a gearbox assembly may be connected to an AI device housing (e.g., an opening of an AI) and/or a first support assembly 591. In embodiments, because an AI device housing 508 is stationary, torque on an output shaft of a gearbox assembly may be initiated by a first motor to cause a first support assembly 591 (and thus a shade element or shade 503) to rotate. In embodiments, other gearbox assemblies and/or hinging assemblies may also be utilized to utilize an output of a motor to cause a first support assembly 591 (and hence a shade element or shade 503) to rotate with respect to an AI device housing 508. In embodiments, a first motor may comprise a pneumatic motor, a servo motor and/or a stepper motor.

In embodiments, a first support assembly 591 may be coupled and/or connected to a second support assembly 593 via a hinging assembly 592. In embodiments, a shading support 505 may comprise a first support assembly 591, a second gearbox assembly (or a linear actuator or hinging assembly) 592, a second support assembly 593, a second motor, and/or a second motor controller. In embodiments, a second motor assembly may comprise a second motor controller and a second motor, and maybe a second gearbox assembly or linear actuator. In embodiments, a shading support 505 may also comprise a motor control which may have a second motor controller mounted and/or installed thereon. In embodiments, a second support assembly 593 may be coupled or connected to a first support assembly 591 via a hinging assembly 592 (e.g., a second gearbox assembly). In embodiments, a second gearbox assembly and a second motor connected thereto, may be connected to a first support assembly 591. In embodiments, an output shaft of a second gearbox assembly may be connected to a second support assembly 593. In embodiments, as a second motor operates and/or rotates, a second gearbox assembly rotates an output shaft which causes a second support assembly 593 to rotate (either upwards or downwards) at a right angle from, or with respect to, a first support assembly 591. In embodiments utilizing a linear actuator as a hinging assembly 592, a steel rod may be coupled to a second support assembly 593 and/or a first support assembly 591 which causes a free hinging between a second support assembly 593 and a first support assembly 591. In embodiments, a linear actuator may be coupled, connected, and/or attached to a second support assembly 593 and/or a first support assembly 591. In embodiments, as a second motor operates and/or rotates a steel rod, a second support assembly 593 moves in an upward or downward direction with respect to a hinged connection (or hinging assembly) 592.

In embodiments, a first support assembly 591 may comprise an elevation motor, an elevation motor shaft, a worm gear, and/or a speed reducing gear. In embodiments, a speed reducing gear may be connected with a connector to a connection plate. In embodiments, a first support assembly 591 may be mechanically coupled to a second support assembly 593 via a connection plate. In embodiments, a connection plate may be connected to a second support assembly 593 via a connector and/or fastener. In embodiments, an elevation motor may cause rotation (e.g., clockwise or counterclockwise) of an elevation motor shaft, which may be mechanically coupled to a worm gear. In embodiments, rotation of an elevation motor shaft may cause rotation (e.g., clockwise or counterclockwise) of a worm gear. In embodiments, a worm gear may be mechanically coupled to a speed reducing gear. In embodiments, rotation of a worm gear may cause rotation of a speed reducing gear via engagement of channels of a worm gear with teeth of a speed reducing gear. In embodiments, a sped reducing gear may be mechanically coupled to a connection plate to a second support assembly via a fastener or connector. In embodiments, rotation of a speed reducing gear may cause a connection plate (and/or a second support assembly 593) to rotate with respect to a first support assembly 591 in a clockwise or counterclockwise direction as is illustrated by reference number 595. In embodiments, a second support assembly 593 may rotate with respect to a first support assembly 591 approximately 90 degrees via movement of the connection plate. In embodiments, a second support assembly 593 may rotate approximately 0 to 30 degrees with respect to a first support assembly 591 via movement of the connection plate.

Still another embodiment involves a computer-readable medium comprising processor-executable instructions configured to implement one or more of the techniques presented herein. A computer-readable medium (e.g., a CD-R, DVD-R, or a platter of a hard disk drive), on which is encoded computer-readable data. This computer-readable data in turn comprises a set of computer instructions configured to operate according to one or more of the principles set forth herein. In one such embodiment, the processor-executable instructions may be configured to perform a method, such as described therein. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

The following discussion provide a brief, general description of a suitable computing environment to implement embodiments of one or more of the provisions set forth herein. The operating environment is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An intelligent umbrella, comprising:
one or more shading elements;
a support assembly, coupled to the one or more shading elements, to provide support for the one or more shading elements, the support assembly comprising one or more microphones to capture audio commands, one or more processors, one or more memory modules and a cellular telecommunications transceiver,
a base assembly, coupled to the support assembly, to provide contact with a surface,
wherein computer-readable instructions stored in the one or more memory modules are executable by the one or more processors to:
convert the captured audio commands into one or more audio files;

generate one or more analog and/or digital phone transmission files based at least in part on the converted one or more audio files; and communicate the one or more analog and/or digital phone transmission files via the cellular transceiver to a base station to initiate transmission of a telephone call without utilizing a mobile computing device to initiate the telephone call.

2. The intelligent umbrella of claim 1, further comprising a database to store a plurality of names and corresponding plurality of phone numbers associated with a user of the intelligent umbrella.

3. The intelligent umbrella of claim 2, wherein to generate the one or more analog and/or digital phone transmission files further comprises computer-readable instructions executable by the one or more processors to:

compare a portion of the one or more audio files to the plurality of names associated with the plurality of phone numbers in the database to identify a telephone number corresponding to the portion of the one or more audio files; and initiate the transmission of the telephone call to the telephone number corresponding to the portion of the one or more audio files.

4. The intelligent umbrella of claim 3, wherein to generate the one or more analog and/or digital phone transmission files further comprises computer-readable instructions executable by the one or more processors to:

generate the one or more analog and/or digital phone transmission files based at least in part on the identified telephone number.

5. An intelligent umbrella, comprising:
one or more shading elements;
a support assembly, coupled to the one or more shading elements, to provide support for the one or more shading elements, the support assembly comprising one or more microphones to capture audio commands, one or more processors, one or more memory modules and a cellular telecommunications transceiver,
a base assembly, coupled to the support assembly, to provide contact with a surface,
wherein computer-readable instructions stored in the one or more memory modules are executed by the one or more processors to:
convert the captured audio commands into digital and/or analog audio files;
communicate the digital and/or analog audio files to a computing device, the computing device comprising a telephony software application to convert the communicated digital and/or analog files to analog or digital telephone transmission files, the telephony software application comprising computer-readable instructions executable by one or more processors on the computing device and not utilizing a mobile computing device to communicate the digital and/or analog audio files to the computing device.

6. The intelligent umbrella of claim 5, the support assembly further comprising an inner core assembly and a support assembly skin, wherein the support assembly skin is attached or connected to the inner core assembly.

7. The intelligent umbrella of claim 6, further comprising a wireless communication antenna, the wireless communication antenna coupled or connected to the cellular telecommunications transceiver.

8. The intelligent umbrella of claim 7, wherein the wireless communication antenna comprises a coil antenna, the coil antenna coupled and/or connected to the inner core assembly.

9. The intelligent umbrella of claim 7, wherein the wireless communication antenna comprises a coil antenna, the coil antenna coupled and/or connected to the support assembly skin.

10. The intelligent umbrella, comprising:
one or more shading elements;
a support assembly, coupled to the one or more shading elements, to provide support for the one or more shading elements, the support assembly comprising one or more microphones to capture audio commands, one or more processors, one or more memory modules and a WiFi telecommunications transceiver,
a base assembly, coupled to the support assembly, to provide contact with a surface,
wherein computer-readable instructions stored in the one or more memory modules are executable by the one or more processors to:
convert the captured audio commands into audio files;
generate a plurality of digital telephone packets corresponding to the captured audio files; and
communicate the generated digital telephone packets via the WiFi telecommunications transceiver to a wireless communications router without utilizing a mobile computing device to generate the plurality of digital telephone packets.

11. The intelligent umbrella of claim 10, the support assembly further comprising an inner core assembly and a support assembly skin, wherein the support assembly skin is attached or connected to the inner core assembly.

12. The intelligent umbrella of claim 11, further comprising a wireless communication antenna, the wireless communication antenna coupled or connected to the WiFi telecommunications transceiver.

13. The intelligent umbrella of claim 12, wherein the wireless communication antenna comprises a coil antenna, the coil antenna coupled and/or connected to the inner core assembly.

14. The intelligent umbrella of claim 12, wherein the wireless communication antenna comprises a coil antenna, the coil antenna coupled and/or connected to the support assembly skin.

15. The intelligent umbrella of claim 12, wherein the wireless communication antenna comprises a metallic ring, the metallic ring coupled and/or connected to the support assembly skin.

16. The intelligent umbrella of claim 12, wherein the wireless communication antenna comprises a metallic ring, the metallic ring coupled and/or connected to the inner core assembly.

17. The intelligent umbrella of claim 12, wherein the wireless communication antenna is part of an integrated circuit or printed circuit board.

18. The intelligent umbrella of claim 17, wherein the integrated circuit or printed circuit board also comprises the WiFi communications transceiver.

19. The integrated umbrella of claim 18, wherein the wireless communication antenna is on a separate layer of the integrated circuit or printed circuit board.

20. The integrated umbrella of claim 18, wherein the wireless communication antenna is on a portion of one of the layers of the integrated circuit or printed circuit board.

* * * * *